United States Patent
Fleming et al.

(10) Patent No.: US 6,929,864 B2
(45) Date of Patent: *Aug. 16, 2005

(54) EXTENSIBLE, VISIBLE LIGHT-TRANSMISSIVE AND INFRARED-REFLECTIVE FILM AND METHODS OF MAKING AND USING THE FILM

(75) Inventors: Robert James Fleming, Saint Paul, MN (US); Clark Ivan Bright, Tucson, AZ (US); Christopher Stewart Lyons, Saint Paul, MN (US)

(73) Assignee: 3M Innovative Properties Company, St. Paul, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 10/222,466

(22) Filed: Aug. 17, 2002

(65) Prior Publication Data

US 2004/0033675 A1 Feb. 19, 2004

(51) Int. Cl.⁷ .................. B32B 15/08; B32B 31/00; C08J 7/04; G02C 7/00
(52) U.S. Cl. .................. 428/457; 428/461; 428/463; 427/487; 427/488; 427/509; 156/99; 156/229
(58) Field of Search .................. 428/457, 461, 428/463; 156/99, 229; 427/487, 488, 509

(56) References Cited

U.S. PATENT DOCUMENTS

| | | |
|---|---|---|
| 3,302,002 A | 1/1967 | Warren |
| 3,311,517 A | 3/1967 | Keslar et al. |
| 3,529,074 A | 9/1970 | Lewis |
| 3,601,471 A | 8/1971 | Seddon et al. |
| 3,682,528 A | 8/1972 | Apfel et al. |
| 3,752,348 A | 8/1973 | Dickason et al. |
| 3,897,140 A | 7/1975 | Tuthill |

(Continued)

FOREIGN PATENT DOCUMENTS

| | | |
|---|---|---|
| EP | 0 722 787 A | 7/1996 |
| EP | 0 810 452 A2 | 12/1997 |
| EP | 0 839 643 | 5/1998 |
| EP | 0873839 A1 | 10/1998 |
| EP | 0944299 A3 | 9/1999 |
| EP | 0944299 A2 | 9/1999 |
| EP | 0977167 A1 | 2/2000 |
| WO | WO 92/12219 | 7/1992 |
| WO | WO 95/10117 | 4/1995 |
| WO | WO 97/01440 | 1/1997 |
| WO | WO 97/01778 | 1/1997 |
| WO | WO 97/04885 | 2/1997 |
| WO | WO 98/26927 | 6/1998 |
| WO | WO 99/36248 | 7/1999 |
| WO | WO 99/36262 | 7/1999 |
| WO | WO 00/26973 | 5/2000 |
| WO | WO 00/48749 | 8/2000 |
| WO | WO 01/31393 A1 | 5/2001 |
| WO | WO 01/58989 | 8/2001 |
| WO | WO 01/96104 A2 | 12/2001 |
| WO | WO 01/96115 A1 | 12/2001 |

OTHER PUBLICATIONS

Affinito, J.D., "Vacuum deposited polymer/silver reflector material", SPIE Press, vol. 2262, Jul. 25, 1994, pp. 276–283.

(Continued)

Primary Examiner—Monique R. Jackson
(74) Attorney, Agent, or Firm—Pamela L. Stewart

(57) ABSTRACT

A film contains first and second metal or metal alloy layers separated by a crosslinked polymeric spacing layer whose thicknesses are such that the film is extensible visible light-transmissive and infrared reflective. The film can be joined or laminated into glazing (especially non-planar vehicular safety glazing) with reduced likelihood that the metal or metal alloy layers will be damaged or distorted.

36 Claims, 9 Drawing Sheets

U.S. PATENT DOCUMENTS

| | | |
|---|---|---|
| 3,990,784 A | 11/1976 | Gelber |
| 4,017,661 A | 4/1977 | Gillery |
| 4,166,876 A | 9/1979 | Chiba et al. |
| 4,226,910 A | 10/1980 | Dahlen et al. |
| 4,234,654 A | 11/1980 | Yatabe et al. |
| 4,320,169 A | 3/1982 | Yatabe et al. |
| 4,413,877 A | 11/1983 | Suzuki et al. |
| 4,537,814 A | 8/1985 | Itoh et al. |
| 4,590,118 A | 5/1986 | Yatabe et al. |
| 4,600,627 A | 7/1986 | Honda et al. |
| 4,639,069 A | 1/1987 | Yatabe et al. |
| 4,645,714 A | 2/1987 | Roche et al. |
| 4,696,719 A | 9/1987 | Bischoff |
| 4,722,515 A | 2/1988 | Ham |
| 4,782,216 A | 11/1988 | Woodard |
| 4,786,783 A | 11/1988 | Woodard |
| 4,799,745 A | 1/1989 | Meyer et al. |
| 4,842,893 A | 6/1989 | Yializis et al. |
| 4,910,090 A | 3/1990 | Kuhlman et al. |
| 4,954,371 A | 9/1990 | Yializis |
| 4,965,408 A | 10/1990 | Chapman et al. ...... 174/35 MS |
| 4,973,511 A | 11/1990 | Farmer et al. |
| 5,011,585 A | 4/1991 | Brochot et al. |
| 5,018,048 A | 5/1991 | Shaw et al. |
| 5,032,461 A | 7/1991 | Shaw et al. |
| 5,071,206 A | 12/1991 | Hood et al. |
| 5,085,141 A | 2/1992 | Triffaux |
| 5,091,244 A | 2/1992 | Biornard |
| 5,097,800 A | 3/1992 | Shaw et al. |
| 5,125,138 A | 6/1992 | Shaw et al. |
| 5,260,095 A | 11/1993 | Affinito |
| 5,324,374 A | 6/1994 | Harmand et al. |
| 5,332,888 A | 7/1994 | Tausch et al. |
| 5,356,947 A | 10/1994 | Ali et al. |
| 5,358,787 A | 10/1994 | Fontana et al. |
| 5,360,659 A | 11/1994 | Arends et al. |
| 5,395,644 A | 3/1995 | Affinito |
| 5,440,446 A | 8/1995 | Shaw et al. |
| 5,489,489 A | 2/1996 | Swirbel et al. |
| 5,547,508 A | 8/1996 | Affinito |
| 5,681,615 A | 10/1997 | Affinito et al. |
| 5,681,666 A | 10/1997 | Treger et al. |
| 5,686,360 A | 11/1997 | Harvey, III et al. |
| 5,699,188 A | 12/1997 | Gilbert et al. |
| 5,725,909 A | 3/1998 | Shaw et al. |
| 5,744,227 A | 4/1998 | Bright et al. |
| 5,757,126 A | 5/1998 | Harvey, III et al. |
| 5,771,562 A | 6/1998 | Harvey, III et al. |
| 5,773,102 A | 6/1998 | Rehfeld |
| 5,783,049 A | 7/1998 | Bright et al. |
| 5,877,895 A | 3/1999 | Shaw et al. ................. 359/588 |
| 5,981,059 A | 11/1999 | Bright et al. |
| 6,007,901 A | 12/1999 | Maschwitz et al. |
| 6,030,671 A | 2/2000 | Yang et al. |
| 6,045,864 A | 4/2000 | Lyons et al. |
| 6,049,419 A | 4/2000 | Wheatley et al. |
| 6,083,628 A | 7/2000 | Yializis |
| 6,111,698 A | 8/2000 | Woodard et al. |
| 6,146,225 A | 11/2000 | Sheats et al. |
| 6,204,480 B1 | 3/2001 | Woodard et al. |
| 6,214,422 B1 | 4/2001 | Yializis |
| 6,231,939 B1 | 5/2001 | Shaw et al. |
| 6,243,201 B1 | 6/2001 | Fleming et al. |
| 6,255,003 B1 | 7/2001 | Woodard et al. |
| 6,268,695 B1 | 7/2001 | Affinito |
| 6,413,645 B1 | 7/2002 | Graff et al. |
| 6,492,026 B1 | 12/2002 | Graff et al. |
| 6,522,067 B1 | 2/2003 | Graff et al. |
| 6,573,652 B1 | 6/2003 | Graff et al. |
| 2001/0010846 A1 | 8/2001 | Hofmeister et al. |

OTHER PUBLICATIONS

International Search Report for related PCT/US03/21887.
U.S. Appl. No. 10/222,449, Aug. 17, 2002, Flexible Electrically Conductive Film.
U.S. Appl. No. 10/222,473, Aug. 17, 2002, Enhanced Heat Mirror Films.
U.S. Appl. No. 10/222,465, Aug. 17, 2002, Durable Transparent EMI Shielding Film.
Presentation: Affinito et al., "Polymer–Oxide Transparent Barrier Layers," SVC 39$^{th}$ Annual Technical Conference, Paper No. W–12, (1996), pp. 1–6.
Presentation: Shaw et al., "A New Vapor Deposition Process for Coating Paper and Polymer Webs," Sixth International Vacuum Web Coating Conference, Reno, NV, Oct. 28, 1992, pp. 18–24.
Presentation: Shaw et al., "A New High Speed Process for Vapor Depositing Acrylate Thin Films: An Update," Society of Vacuum Coaters 36$^{th}$ Annual Technical Conference (1993), pp. 348–352.
Presentation: Shaw et al., "Use of Vapor Deposited Acrylate Coatings to Improve the Barrier Properties of Metallized Film," Society of Vacuum Coaters 37$^{th}$ Annual Technical Conference (1994), pp. 240–247.
Presentation: Shaw et al., "Use of Evaporated Acrylate Coatings to Smooth the Surface of Polyester and Polypropylene Film Substrates," Rad Tech (1996), (12 pages).
Article: Affinito et al., "Vacuum Deposited Polymer/Metal Multilayer Films for Optical Application," *Thin Solid Films*, vol. 270, (1995), pp. 43–48.
Article: Cairns et al., "Strain–Dependent Electrical Resistance of Tin–Doped Indium Oxide on Polymer Substrates," *Applied Physics Letters*, vol. 76, No. 11, Mar. 13, 2000, pp. 425–427.

EXTENSIBLE, VISIBLE LIGHT-TRANSMISSIVE AND INFRARED-REFLECTIVE FILM AND METHODS OF MAKING AND USING THE FILM

FIELD OF THE INVENTION

This invention relates to infrared reflecting films and optical articles made therefrom.

BACKGROUND

Glazing materials sometimes include one or more functional layers engineered to enhance the performance of the glazing. One important functional layer reduces transmission of infrared radiation. Infrared-rejecting functional layers are typically made of partially transparent metallized or dyed polymer film constructions that reflect or absorb unwanted solar radiation. References describing such functional layers include U.S. Pat. Nos. 4,590,118, 4,639,069 and 4,799,745.

Infrared-rejecting functional layers are of particular interest in vehicular safety glazing. Conventional vehicular safety glazing is a laminate of two rigid layers, typically glass, and an anti-lacerative mechanical energy-absorbing interlayer, typically plasticized polyvinyl butyral ("PVB"). The glazing is prepared by placing the PVB layer between the glass layers, eliminating air from the engaging surfaces, and then subjecting the assembly to elevated temperature and pressure in an autoclave to fusion bond the PVB and glass into an optically clear structure. The resulting safety glazing can be used, for example, in an automobile, airplane, train or other vehicle.

When infrared-rejecting functional layers are used in a windshield, regulations require that the completed laminate should have a luminous transmittance (measured according to ASTM E308) of at least 70%. When used in other vehicular glazing structures, such as side windows, backlights or sunroofs, or in other applications such as architectural glazing, there are typically no regulatory limits on the level of visible transmission. In any event, the laminate preferably should reject a substantial portion of solar radiation outside the visible portion of the spectrum in a wavelength region of interest, e.g., at least 50% of the light in a band at least 100 nm wide between about 700 nm and about 2,000 nm.

FIG. 1A shows a conventional pre-laminate structure 10 that can be bonded to one or more glass sheets to make a vehicular safety glazing laminate. The pre-laminate 10 includes a reflective functional layer 12 having a flexible plastic support layer 14 and a metallized layer 16. The functional layer 12 is bonded on at least one side to at least one layer 18 of PVB. Optionally, the functional layer 12 can be bonded to a second layer 20 of PVB. One or the other or both of the PVB layers 18, 20 can include additional performance enhancing layers. For example, the PVB layer 20 may optionally include a shade band layer 22.

Referring to FIG. 1B, pre-laminate 10 is conventionally matched with at least one, and preferably two sheets of glass 30, 32 to form a vehicular safety glazing laminate 34. To bond pre-laminate 10 to glass sheets 30, 32, pre-laminate 10 and sheets 30, 32 are placed together and heated to cause the PVB layers 18, 20 and the functional layer 12 to conform to the contours of the glass sheets 30, 32. This bonding and heating process is typically carried out using a vacuum de-airing method or a nip roll method. In the vacuum de-airing method, the entire laminate is placed into a bag connected to a vacuum system (or a flexible sealing band or ring is placed around the edge of the laminate and connected to a vacuum system) and a vacuum is drawn while the laminate is heated, thereby removing air from the glass PVB interface(s) and temporarily bonding the glass to the PVB. The nip roll method uses one or more pressure roller devices, commonly called nip rolls, which apply pressure to the laminate to de-air and promote bonding between the layers. For either the vacuum de-airing method or the nip roll method, the lamination process typically is completed by heating the laminate assembly in an autoclave under pressure. Compared to the vacuum de-airing methods, the nip roll method requires fewer manual steps and allows the laminates to be assembled more quickly. For at least these reasons, the nip roll method is a preferred lamination method for many automotive glazing manufacturers.

SUMMARY OF THE INVENTION

To enhance vehicle aerodynamics and improve outward visibility, many vehicular window shapes are not planar, and increasingly include severe angles and complex curves. When the pre-laminate 10 is placed between complex curved glass sheets, the functional layer 12 does not always conform adequately to complex curves, especially when the glass sheets are large or when the nip roll method is employed. Wrinkles, folds or pleats can form in the functional layer 12. If functional layer 12 is metallized, cracks can form in the metallized layer 16 during nip rolling, creating an optical defect in the safety glazing. At present, nip roll lamination typically is limited to small metallized laminates having no curvature or only modest one-dimensional curvature.

An especially useful infrared-rejecting functional layer can be formed from an infrared-rejecting Fabry-Perot stack. In such a stack, a transparent dielectric spacing layer separates two or more partially reflective thin metal or metal alloy layers. The metal or metal alloy layers (which for brevity will sometimes be referred to herein as "metal layers") typically contain elemental or alloyed silver, copper or gold. The dielectric layer typically contains an inorganic oxide (applied from an organic solution or applied using sputter deposition) or an organic polymer (applied by dissolving the polymer in a solvent solution). The dielectric layer optical thickness (defined as the physical thickness of the dielectric layer times its in-plane index of refraction) preferably is about ¼ the wavelength of the center of to desired pass band. Light whose wavelength is within the pass band is mainly transmitted through the thin metal layers. Light whose wavelength is above the pass band is mainly reflected by the thin metal layers or suppressed due to destructive interference. Attempts have been made to include functional layers containing infrared-rejecting Fabry-Perot stacks in glazing, e.g., architectural and vehicular safety glazing. However, these attempts have met with only limited success. Fabrication of non-planar glazing is particularly difficult. We believe these difficulties may be due in part to the fragility of one or more of the stack layers, to the tendency of the metal layers to corrode, or to localized changes in the distance between the metal layers caused by the stretching, heating and cooling that take place during lamination, autoclaving and subsequent use of the glazing. We believe these difficulties may be aggravated when the functional layer is placed adjacent to PVB. PVB sheets typically contain significant quantities of plasticizers and other adjuvants. We believe that these adjuvants can migrate into an infrared-rejecting functional layer and cause corrosion, swelling or other effects that can lead to localized changes in to distance between the metal layers.

We have found that by forming the dielectric layer from a polymer that is crosslinked, we can successfully laminate functional layers containing Fabry-Perot stacks into nonplanar glazing. The results appear to be much better than those obtained when the dielectric layer is formed entirely from an inorganic material or entirely from an uncrosslinked organic material. We have also found that a further improvement can be obtained by modifying an interface between the thin metal layer or layers and adjacent layers within the film to enhance interlayer adhesion.

Accordingly, in one aspect, the present invention provides a process for making a film comprising:
a) providing a visible light-transmissive support,
b) forming a visible light-transmissive first metal or metal alloy layer atop the support,
c) forming an organic spacing layer atop the first metal or metal alloy layer,
d) crosslinking the spacing layer, and
e) forming a visible light-transmissive second metal or metal alloy layer atop the organic spacing layer,
whereby the thicknesses of the first and second metal or metal alloy layers and the crosslinked spacing layer are such that the film is visible light-transmissive and infrared-reflective.

In a second aspect, the invention provides a process for making a glazing article, comprising assembling a layer of glazing material and a visible light-transmissive and infrared-reflective film comprising first and second metal or metal alloy layers separated by a crosslinked polymeric spacing layer and bonding the glazing material and the film together into a unitary article.

In a third aspect, the invention provides a process for making a laminate article comprising:
a) assembling a first glazing material layer, a first mechanical energy-absorbing layer, a visible light-transmissive and infrared-reflective film layer comprising first and second metal or metal alloy layers separated by a crosslinked polymeric spacing layer, a second mechanical energy-absorbing layer and a second glazing material layer,
b) removing residual air from between the layers, and
c) heating and applying pressure to the layers to bond the layers together into a unitary article.

In a fourth aspect, the invention provides a film comprising first and second metal or metal alloy layers separated by a crosslinked polymeric spacing layer whose thicknesses are such that the film is visible light-transmissive and infrared reflective.

In a fifth aspect, the invention provides a safety glazing pre-laminate comprising at least one layer of a mechanical energy-absorbing material joined to a visible light-transmissive and infrared-reflective film comprising first and second metal or metal alloy layers separated by a crosslinked polymeric spacing layer.

In a sixth aspect, the invention provides a glazing article comprising at least one layer of a glazing material joined to a visible light-transmissive and infrared-reflective film comprising first and second metal or metal alloy layers separated by a crosslinked polymeric spacing layer.

In a seventh aspect, the invention provides a vehicle with glazing comprising at least one windshield, backlight, side window or skylight comprising a visible light-transmissive and infrared reflective film comprising first and second metal or metal alloy layers separated by a crosslinked polymeric spacing layer.

BRIEF DESCRIPTION OF THE DRAWINGS

Like reference symbols in the various figures of the drawing indicate like elements. The elements in the drawing are not to scale.

DETAILED DESCRIPTION

Figure 1A:
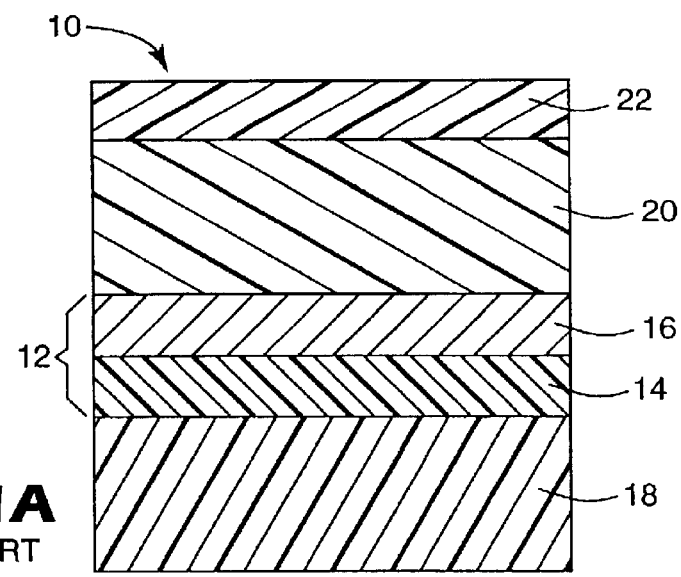
FIG. 1A is a schematic cross-sectional view of a pre-laminate structure of the prior art.
Figure 1B:
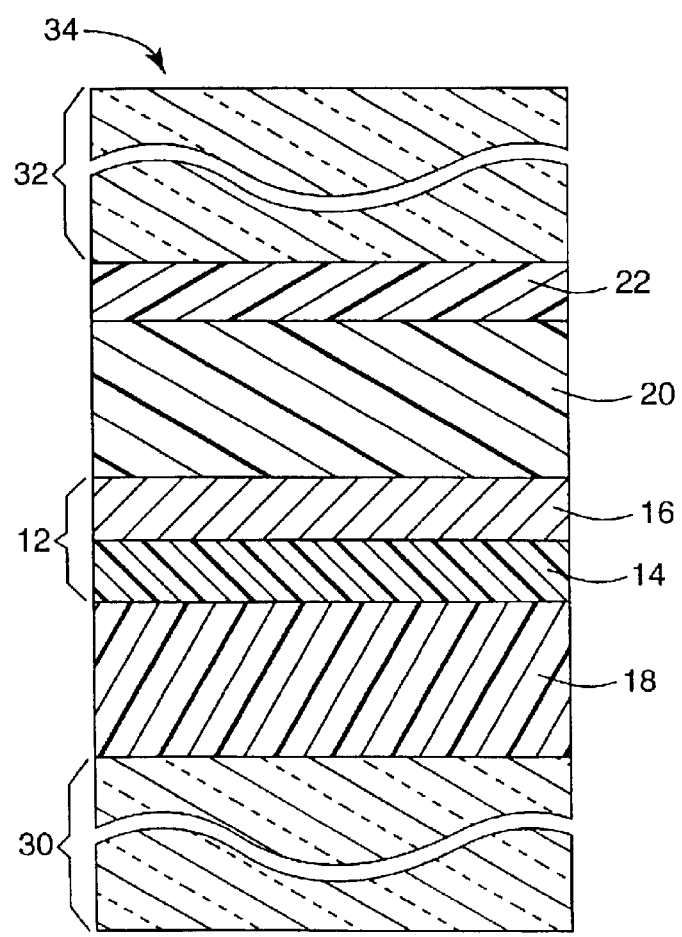
FIG. 1B is a schematic cross-sectional view of a vehicular safety glazing laminate of the prior art.

By using words of orientation such as "atop", "on", "uppermost" and the like for the location of various layers in the films or articles of the invention, we refer to the relative position of one or more layers with respect to a horizontal support layer. We do not intend that the films or articles should have any particular orientation in space during or after their manufacture.

By a "crosslinked" polymer, we mean a polymer in which polymer chains are joined together by covalent chemical bonds, usually via crosslinking molecules or groups, to form a network polymer. A crosslinked polymer is generally characterized by insolubility, but may be swellable in the presence of an appropriate solvent. The term "polymer" includes homopolymers and copolymers, as well as homopolymers or copolymers that may be formed in a miscible blend, e.g., by coextrusion or by reaction, including, e.g., transesterification. The term "copolymer" includes both random and block copolymers.

By an "extensible" metal or metal alloy layer we refer to a layer that when incorporated into the visible light-transmassive film can be stretched by at least 3% in an in-plane direction without loss of electrical continuity and without forming visible discontinuities in the surface of the metal or metal alloy layer as detected by the naked eye at a distance of about 0.25 meters.

By a "visible light-transmissive" support, layer, film or article, we mean that the support, layer, film or article has a transmission in the visible portion of the spectrum, $T_{vis}$, of at least about 20%, measured along the normal axis. By an "infrared-reflective" support, layer, film or article, we mean that the support, layer, film or article reflects at least about 50% of light in a band at least 100 nm wide in a wavelength region from about 700 nm to about 2000 nm, measured at a near-normal angle (e.g., at about a 6° angle of incidence). By "light" we mean solar radiation.

By a "non-planar" surface or article (e.g., of glass or other glazing material), we mean that surface or article has a continuous, intermittent, unidirectional or compound curvature. By a surface or article with "compound curvature", we mean that the surface or article curves in two different, non-linear directions from a single point.

By "without substantial cracking or creasing" we refer to a film that has been laminated into an article, and in which there is a lack of visible discontinuities in the surface of the film or the visible metal or metal alloy layers as detected by the naked eye at a distance of about 1 meter, preferably about 0.5 meters. By "without substantial wrinkling" we refer to a film that has been laminated into an article, and in which there is a lack of small ridges or furrows resulting from contraction of the smooth film surface as detected using the naked eye at a distance of about 1 meter, preferably about 0.5 meters. By "optically clear" we refer to a laminated article in which there is an absence of visibly noticeable distortion, haze or flaws as detected by the naked eye at a distance of about 1 meter, preferably about 0.5 meters.

Figure 2:
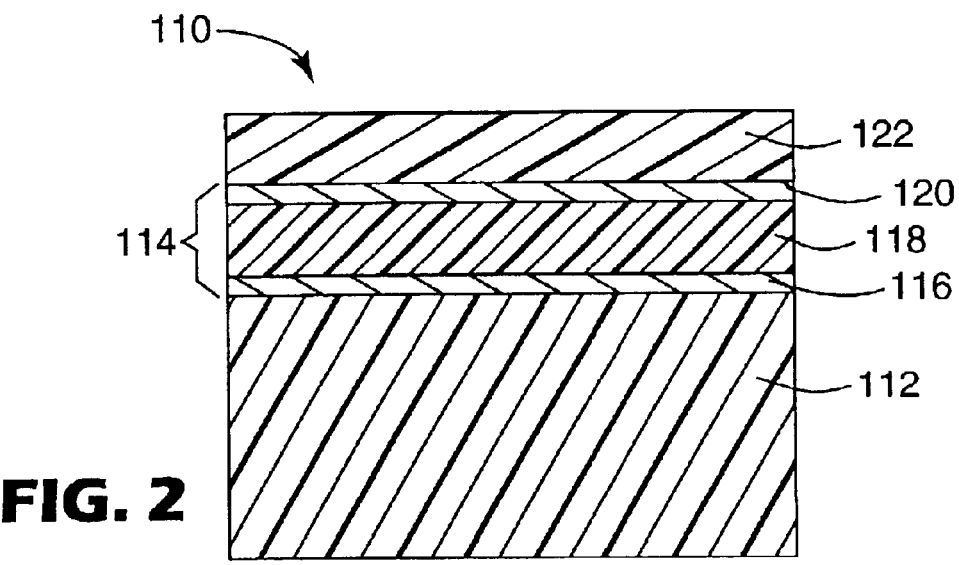
FIG. 2 is a schematic cross-sectional view of a film of the invention.

Referring to FIG. 2, a film of the invention is shown generally at 110. Film 110 includes support 112 made of a transparent, flexible plastic film such as polyethylene terephthalate ("PET"). Fabry-Perot interference stack 114 lies atop support 112. Stack 114 includes a first thin layer 116 made of silver, a crosslinked polymeric spacing layer 118 made of a crosslinked acrylate polymer, and a second thin metal layer 120 made of silver. Optional protective layer 122 made of crosslinked acrylate polymer lies atop stack 114.

Figure 3:
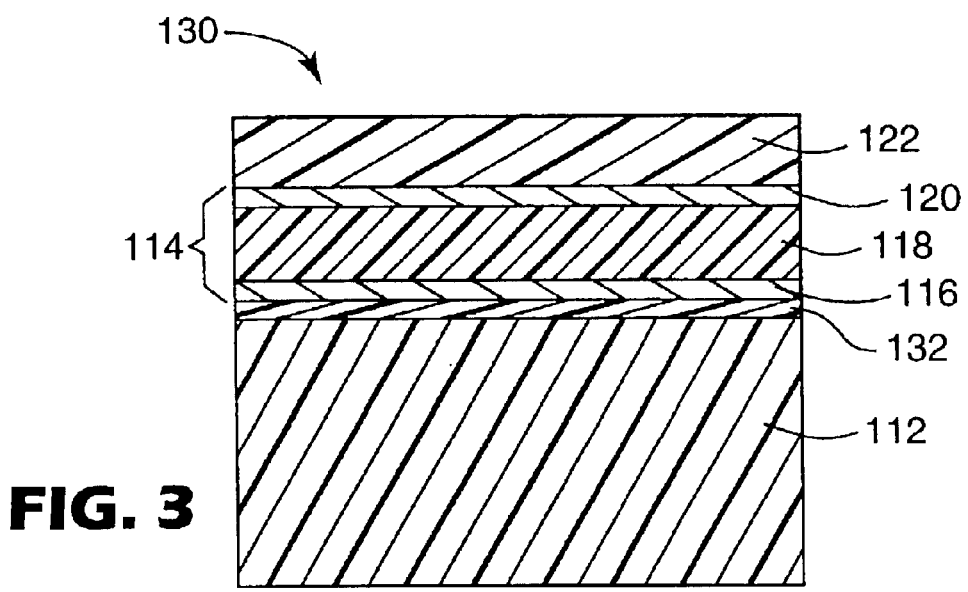
FIG. 3 is a schematic cross-sectional view of another film of the invention.

In FIG. 3, another film of the invention is shown generally at 130. Film 130 resembles film 110, but includes a base coat layer 132 made from crosslinked acrylate polymer between support 112 and stack 114.

Figure 4:
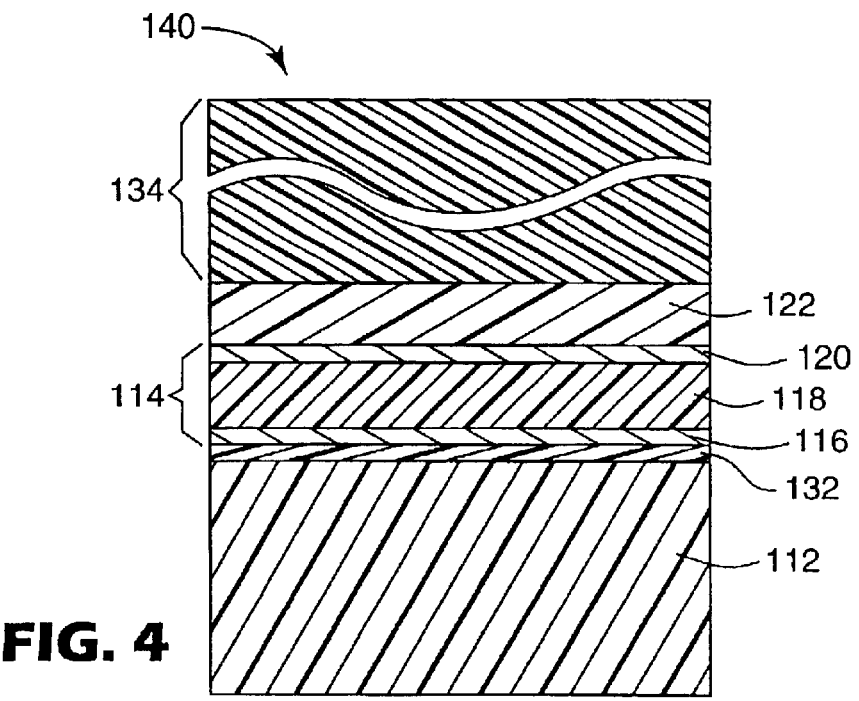
FIG. 4 is a schematic cross-sectional view of a pre-laminate of the invention.

FIG. 4 shows a pre-laminate 140 of the invention. Pre-laminate 140 includes a mechanical energy-absorbing layer 134 made of PVB joined to protective layer 122 of film 130.

Figure 5:
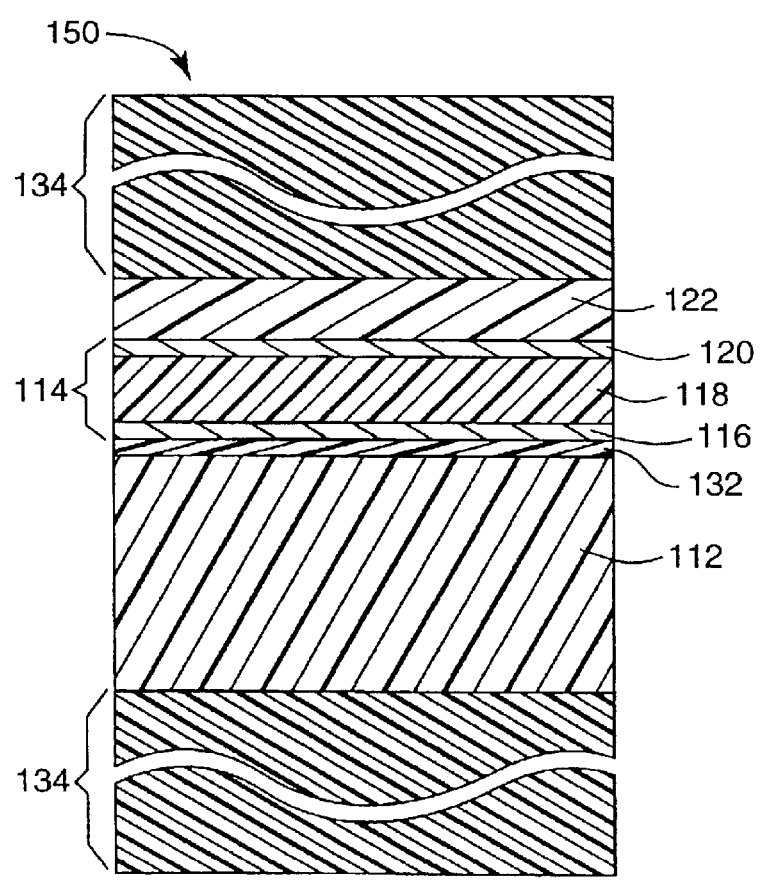
FIG. 5 is a schematic cross-sectional view of another pre-laminate of the invention.

FIG. 5 shows another pre-laminate 150 of the invention. Pre-laminate 150 includes a second mechanical energy-absorbing layer 134 joined to support 112 of film 140. This provides a more durable pre-laminate than the pre-laminate shown in FIG. 4.

Figure 6:
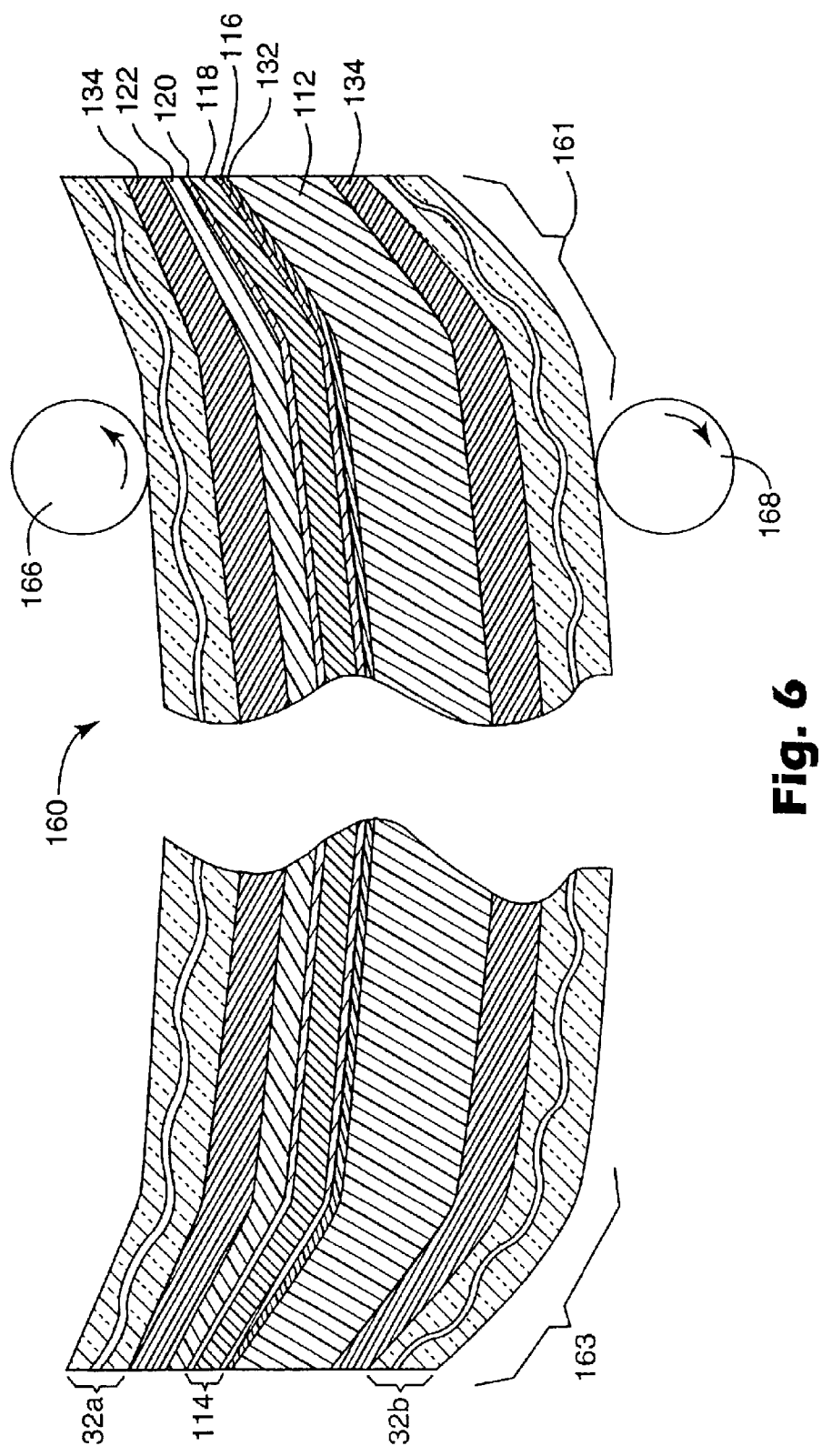
FIG. 6 is a schematic cross-sectional view of a windshield of the invention.

FIG. 6 shows a cross-sectional view of a laminated safety windshield of the invention 160. Windshield 160 has a continuously curved surface whose radius of curvature is relatively large near the center region (shown only as broken lines in FIG. 6) of windshield 160 but decreases to a relatively small value near the more sharply curved end regions 161, 163 of windshield 160. As shown in FIG. 6, nip rollers 166, 168 are being used to de-air and tack pre-laminate 150 between the two pieces of glass 32a and 32b.

Figure 7:
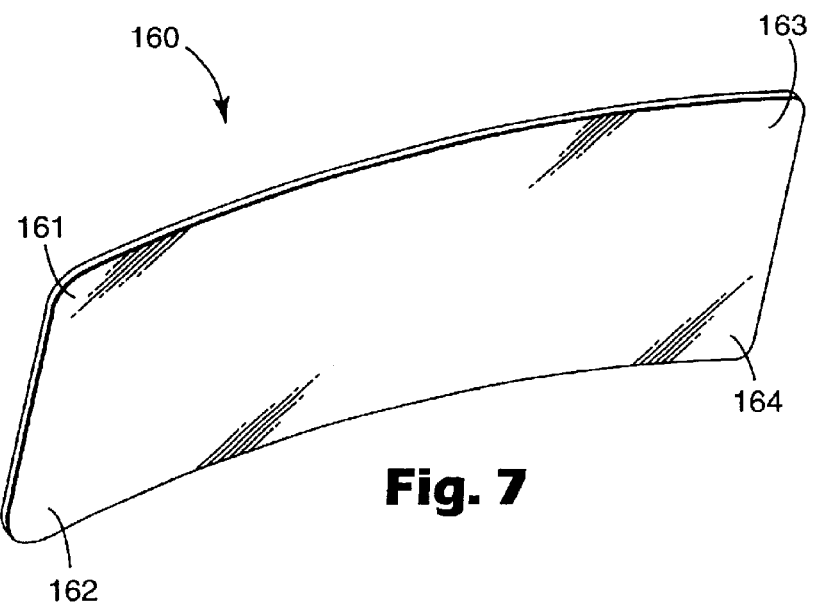
FIG. 7 is a perspective view of the windshield of FIG. 6.

FIG. 7 shows a perspective view of windshield 160 of FIG. 6. Curved regions 161, 162, 163 and 164 have compound curvatures. If pre-laminate 150 shrinks somewhat during the de-airing/lamination and autoclave steps that are used to form windshield 160, then it will be easier to obtain a wrinkle-free appearance through windshield 160.

The films of the invention preferably include a visible light-transparent support. Preferred supports have visible light transmission of at least about 70% at 550 nm. Particularly preferred supports are flexible plastic materials including thermoplastic films such as polyesters (e.g., PET), polyacrylates (e.g., polymethyl methacrylate), polycarbonates, polypropylenes, high or low density polyethylenes, polyethylene naphthalates, polysulfones, polyether sulfones, polyurethanes, polyamides, polyvinyl butyral, polyvinyl chloride, polyvinylidene difluoride and polyethylene sulfide; and thermoset films such as cellulose derivatives, polyimide, polyimide benzoxazole and poly benzoxazole.

The support can also be a multilayer optical film ("MOW") coated with at least one crosslinked polymeric layer and metal or metal alloy layer, such as those described in copending application Ser. No. 10/222,473 filed Aug. 17, 2002 and entitled "Enhanced Heat Mirror Films", incorporated herein by reference. The MOF support is provided with a crosslinked polymeric spacing layer and at least a second metal or metal alloy layer to provide a Fabry-Perot stack atop the MOF support. The Fabry-Perot stack and the MOF support combine to provide an infrared-rejecting film having a broadened reflection of infrared radiation compared to a film containing only the Fabry-Perot stack or only the MOF support. Use of a crosslinked polymeric spacing layer in the Fabry-Perot interference stack renders the film more readily orientable without damaging the metal layers or altering their spacing. Orienting and optionally heat-setting the MOF support or finished film can enhance the conformability of the film to non-planar surfaces.

Supports made of PET and MOF are especially preferred. Preferably the support has a thickness of about 0.01 to about 1 mm.

The films of the invention include an infrared-rejecting Fabry-Perot optical interference stack. Each stack includes a first metal layer, a crosslinked polymeric spacing layer and a second metal layer. More than one such stack can be present in the film if desired. Additional stacks can conveniently be formed by placing additional crosslinked polymeric layers and metal layers atop the previous stack(s).

The first, second and any additional metal layers in the stack can be the same as or different from one another. Preferred metals include elemental silver, gold, copper, nickel, and chrome, with silver being especially preferred. Alloys such as stainless steel or dispersions containing these metals in admixture with one another or with other metals also can be employed. The metal layers need not have the same thickness. Preferably the metal layers are sufficiently thick so as to be continuous, and sufficiently thin so as to ensure that the film and articles containing the film will have the desired degree of visible light transmission. Preferably the physical thickness (as opposed to the optical thickness) of the metal layers is about 3 to about 50 nm, more preferably about 4 to about 15 nm. Typically the first metal layer is formed by depositing it on the above-mentioned support. The first, second and any additional metal layers preferably are applied using techniques employed in the film metallizing art such as sputtering (e.g., cathode or planar magnetron sputtering), evaporation (e.g., resistive or electron beam evaporation), chemical vapor deposition, plating and the like.

In addition to their optical function, the metal layers can be used for purposes such as antennae, electromagnetic shielding, and for thin film heating applications such as de-fogging, de-misting, defrosting or deicing. Thin film heating applications can require substantial current-carrying ability. Preferably in such thin film heating applications two or more of the metallized film layers are electrically connected together in parallel using busbars, e.g., as shown in U.S. Pat. Nos. 3,529,074, 4,782,216, 4,786,783, 5,324,374 and 5,332,888. The combination of multiple current-currying metal layers separated by crosslinked polymeric spacing layers provides a stack having increased resistance to delamination or fracture when subjected to bending, flexing and stretching, as described in more detail in copending application Ser. No. 10/222,449 filed Aug. 17, 2002 and entitled "Flexible Electrically Conductive Film", incorporated herein by reference. Even very small scratches or fractures within the metal layer can cause early failure of current-carrying embodiments of the film. Such failures often are due to hot spot formation, especially when the scratch or fracture is perpendicular to the direction of current flow through the metal layer. Preferably the layers will maintain electrical conductivity after the application of more than 0.15 W/cm$^2$ power to the film.

The smoothness and continuity of the first metal layer and its adhesion to the support preferably are enhanced by appropriate pretreatment of the support. A preferred pretreatment regimen involves electrical discharge pretreatment of the support in the presence of a reactive or non-reactive atmosphere (e.g., plasma, glow discharge, corona discharge, dielectric barrier discharge or atmospheric pressure discharge); chemical pretreatment; flame pretreatment; or application of a nucleating layer such as the oxides and alloys described in U.S. Pat. Nos. 3,601,471 and 3,682,528. These pretreatments help ensure that the surface of the support will be receptive to the subsequently applied metal layer. Plasma pretreatment is particularly preferred. A further particularly preferred pretreatment regimen involves coating the support with an inorganic or organic base coat layer such as layer 132 above, optionally followed by further pretreatment using plasma or one of the other pretreatments described above. Organic base coat layers, and especially base coat layers based on crosslinked acrylate polymers, are especially preferred. Most preferably, the base coat layer is formed by flash evaporation and vapor deposition of a radiation-crosslinkable monomer (e.g., an acrylate monomer), followed by crosslinking in situ (using, for example, an electron beam apparatus, UV light source, electrical discharge apparatus or other suitable device), as described in U.S. Pat. Nos. 4,696,719, 4,722,515, 4,842,893, 4,954,371, 5,018,048, 5,032,461, 5,097,800, 5,125,138, 5,440,446, 5,547,908, 6,045,864, 6,231,939 and 6,214,422; in published PCT Application No. WO 00/26973; in D. G. Shaw and M. G. Langlois, "A New Vapor Deposition Process for Coating Paper and Polymer Webs", 6th International Vacuum Coating Conference (1992); in D. G. Shaw and M. G. Langlois, "A New High Speed Process for Vapor Depositing Acrylate Thin Films: An Update", Society of Vacuum Coaters 36th Annual Technical Conference Proceedings (1993); in D. G. Shaw and M. G. Langlois, "Use of Vapor Deposited Acrylate Coatings to Improve the Barrier Properties of Metallized Film", Society of Vacuum Coaters 37th Annual Technical Conference Proceedings (1994); in D. G. Shaw, M. Roehrig, M. G. Langlois and C. Sheehan, "Use of Evaporated Acrylate Coatings to Smooth the Surface of Polyester and Polypropylene Film Substrates", RadTech (1996); in J. Affinito, P. Martin, M. Gross, C. Coronado and E. Greenwell, "Vacuum deposited polymer/metal multilayer films for optical application", Thin Solid Films 270, 43–48 (1995); and in J. D. Affinito, M. E. Gross, C. A. Coronado, G. L. Graff, E. N. Greenwell and P. M. Martin, "Polymer-Oxide Transparent Barrier Layers", Society of Vacuum Coaters 39th Annual Technical Conference Proceedings (1996). If desired, the base coat can also be applied using conventional coating methods such as roll coating (e.g., gravure roll coating) or spray coating (e.g., electrostatic spray coating), then crosslinked using, for example, UV radiation. The desired chemical composition and thickness of the base coat layer will depend in part on the nature of the support. For example, for a PET support, the base coat layer preferably is formed from an acrylate monomer and typically will have a thickness of only a few nm up to about 2 micrometers.

The adhesion of the first metal layer to the base coat layer can be further improved by including an adhesion-promoting or anticorrosion additive in the base coat layer. This can affect the surface energy or other relevant characteristics of the interface between the base coat layer and the first metal layer. Suitable adhesion-promoting or anticorrosion additives include mercaptans, acids (such as carboxylic acids or organic phosphoric acids), triazoles, dyes and wetting agents. Ethylene glycol bis-thioglycolate (described in U.S. Pat. No. 4,645,714) is a particularly preferred additive. The additive preferably is present in amounts sufficient to obtain the desired degree of increased adhesion, without causing undue oxidation or other degradation of the first metal layer.

The crosslinked polymeric spacing layer lies atop the first metal layer, and can be formed from a variety of organic materials. Preferably the spacing layer is crosslinked in situ atop the first metal or alloy layer. If desired, the polymeric layer can be applied using conventional coating methods such as roll coating (e.g., gravure roll coating) or spray coating (e.g., electrostatic spray coating), then crosslinked using, for example, UV radiation. Most preferably the spacing layer is formed by flash evaporation, vapor deposition and crosslinking of a monomer as described above. Volatilizable (meth)acrylate monomers are preferred for use in such a process, with volatilizable acrylate monomers being especially preferred. Preferred (meth)acrylates have a number average molecular weight in the range of about 150 to about 600, more preferably about 200 to about 400. Other preferred (meth)acrylates have a value of the ratio of the molecular weight to the number of acrylate functional groups per molecule in the range of about 150 to about 600 g/mole/(meth)acrylate group, more preferably about 200 to about 400 g/mole/(meth)acrylate group. Fluorinated (meth) acrylates can be used at higher molecular weight ranges or ratios, e.g., about 400 to about 3000 molecular weight or about 400 to about 3000 g/mole/(meth)acrylate group. Coating efficiency can be improved by cooling the support. Particularly preferred monomers include multifunctional (meth)acrylates, used alone or in combination with other multifunctional or monofunctional (meth)acrylates, such as hexanediol diacrylate, ethoxyethyl acrylate, phenoxyethyl acrylate, cyanoethyl (mono)acrylate, isobornyl acrylate, isobornyl methacrylate, octadecyl acrylate, isodecyl acrylate, lauryl acrylate, beta-carboxyethyl acrylate, tetrahydrofurfuryl acrylate, dinitrile acrylate, pentafluorophenyl acrylate, nitrophenyl acrylate, 2-phenoxyethyl acrylate, 2-phenoxyethyl methacrylate, 2,2,2-trifluoromethyl (meth) acrylate, diethylene glycol diacrylate, triethylene glycol diacrylate, triethylene glycol dimethacrylate, tripropylene glycol diacrylate, tetraethylene glycol diacrylate, neopentyl glycol diacrylate, propoxylated neopentyl glycol diacrylate, polyethylene glycol diacrylate, tetraethylene glycol diacrylate, bisphenol A epoxy diacrylate, 1,6-hexanediol dimethacrylate, trimethylol propane triacrylate, ethoxylated trimethylol propane triacrylate, propylated trimethylol propane triacrylate, tris(2-hydroxyethyl)-isocyanurate triacrylate, pentaerythritol triacrylate, phenylthioethyl acrylate, naphthloxyethyl acrylate, IRR-214 cyclic diacrylate from UCB Chemicals, epoxy acrylate RDX80095 from Rad-Cure Corporation, and mixtures thereof. A variety of other curable materials can be included in the crosslinked polymeric layer, e.g., vinyl ethers, vinyl naphthylene, acrylonitrile, and mixtures thereof. The physical thickness of the crosslinked polymeric spacing layer will depend in part upon its refractive index and in part upon the desired optical characteristics of the Fabry-Perot stack. For use in an infrared-rejecting interference stack, the crosslinked polymeric spacing layer typically will have a refractive index of about 1.3 to about 1.7, and preferably will have an optical thickness of about 75 to about 200 nm, more preferably about 100 to about 150 nm and a corresponding physical thickness of about 50 to about 130 nm, more preferably about 65 to about 100 nm.

Optical modeling can be employed to design suitable layer thicknesses in the articles of the invention. For example, for a 51 micrometer thick PET support coated with a 5 layer infrared-rejecting acrylate/metal/acrylate/metal/acrylate optical stack in which the base coat, crosslinked polymeric spacing layer and topcoat are made of tripropylene glycol diacrylate (refractive index 1.4662) and the metal layers are made of magnetron sputtered silver (refractive index 0.154), two exemplary target structures have respective layer physical thicknesses from the base coat through the topcoat of 129/12/104/12/54 nm or 116/10/116/10/55 nm.

A crosslinked polymeric spacing layer has several advantages over a non-crosslinked polymeric spacing layer. A crosslinked polymeric spacing layer will neither melt nor soften as appreciably with heating as a non-crosslinked polymeric spacing layer, and thus is less likely to flow, deform or thin significantly under the simultaneous influence of temperature and pressure, as during a forming or laminating process. A crosslinked polymeric spacing layer is highly solvent resistant, whereas a non-crosslinked polymeric spacing layer may be dissolved or appreciably softened by solvents such as those used to form the non-crosslinked polymeric spacing layer. Crosslinked polymeric spacing layers can have greater resistance to liquids that may be encountered by the films of the present invention, such as cleaning solutions for window applications and automotive fluids such as gasoline, oil, transmission fluid, etc., for automotive applications. A crosslinked polymeric spacing layer may also have desirable physical properties compared to a non-crosslinked polymeric spacing layer fabricated from a similar polymer, such as higher modulus and stiffness, better elastic recovery when strained or better resilience.

The smoothness and continuity of the spacing layer and its adhesion to the first metal layer preferably are enhanced by appropriate pretreatment of the first metal layer prior to application of the spacing layer, or by inclusion of a suitable additive in the spacing layer. Preferred pretreatments include the support pretreatments described above, with plasma pretreatment of the first metal layer being particularly preferred. Preferred additives for the spacing layer include the base coat layer additives described above.

The smoothness and continuity of the second metal layer and its adhesion to the spacing layer preferably are enhanced by appropriate pretreatment of the spacing layer prior to application of the second metal layer, or by inclusion of a suitable additive in the spacing layer. Preferred pretreatments include the support pretreatments described above, with plasma pretreatment of the spacing layer being particularly preferred. Preferred additives for the spacing layer include the base coat layer additives described above.

Surprisingly, we have also discovered that when one or both of the above-described pretreatments is employed, and when one or more of the above-described base coat layer additives is incorporated into the monomer mixture used for forming the spacing layer(s), the resistance of the metal layer(s) to corrosion under the influence of an electrical current is markedly enhanced. Plasma treatment is a preferred pretreatment, with a nitrogen plasma being especially preferred. Ethylene glycol bis-thioglycolate is a preferred additive for incorporation into the monomer mixture.

If desired, additional pairs of crosslinked polymeric spacing layers and metal layers can be applied atop the second metal layer. For example, stacks containing 3 metal layers or 4 metal layers provide desirable characteristics for some applications. Stacks containing 2 to 4 metal layers in which each of the metal layers has a crosslinked polymeric layer adjacent to each of its faces are especially preferred.

The uppermost metal layer preferably is overcoated with a suitable protective layer such as layer 122 above. If desired, the protective layer can be applied using conventional coating methods such as roll coating (e.g., gravure roll coating) or spray coating (e.g., electrostatic spray coating), then crosslinked using, for example, UV radiation. Most preferably the protective layer is formed by flash evaporation, vapor deposition and crosslinking of a monomer as described above. Volatilizable (meth)acrylate monomers are preferred for use in such a protective layer, with volatilizable acrylate monomers being especially preferred. When the film of the invention includes a protective layer or other surface layer and is laminated between sheets of a mechanical energy-absorbing material such as PVB, the index of refraction of the protective layer or other surface layer can be selected to minimize reflection at the interface caused by any difference in refractive indices between the PVB and the film. The protective layer can also be post-treated to enhance adhesion of the protective layer to a mechanical energy-absorbing material such as PVB. Preferred post-treatments include the support pretreatments described above, with plasma post-treatment of both sides of the film being particularly preferred. Preferred additives for the protective layer include the base coat layer additives described above.

Figure 8:
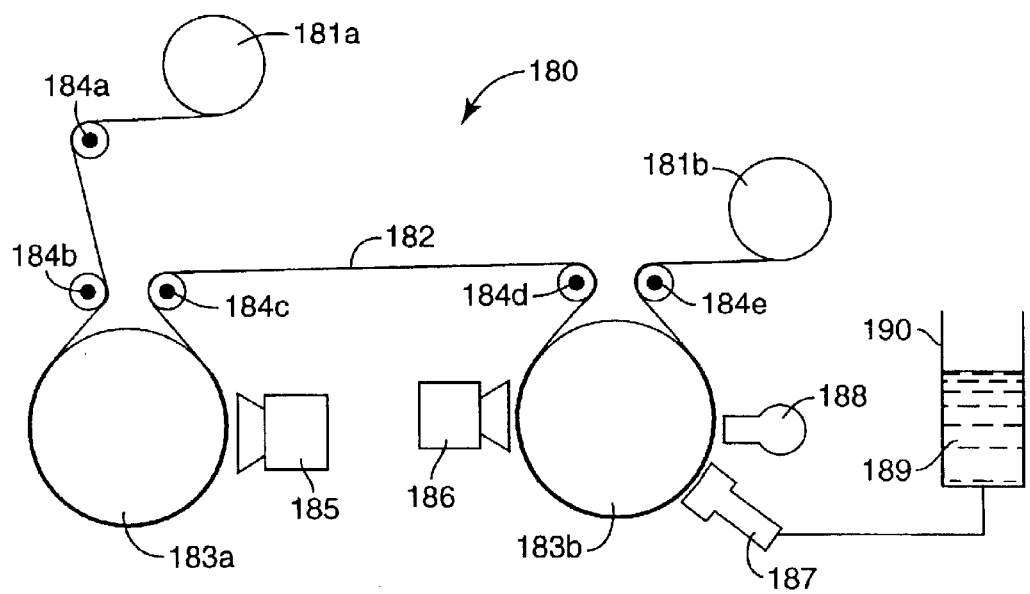
FIG. 8 is a schematic view of an apparatus for carrying out a process of the invention.

An apparatus 180 that can conveniently be used to manufacture the films of the invention is shown in FIG. 8. Powered reels 181*a* and 181*b* move supporting web 182 back and forth through apparatus 180. Temperature-controlled rotating drums 183*a* and 183*b*, and idlers 184*a*, 184*b*, 184*c*, 184*d* and 184*e* carry web 182 past metal sputtering applicator 185, plasma pretreater 186, monomer evaporator 187 and E-beam crosslinking apparatus 188. Liquid monomer 189 is supplied to evaporator 187 from reservoir 190. Successive layers can be applied to web 182 using multiple passes through apparatus 180. Apparatus 180 can be enclosed in a suitable chamber (not shown in FIG. 8) and maintained under vacuum or supplied with a suitable inert atmosphere in order to discourage oxygen, water vapor, dust and other atmospheric contaminants from interfering with the various pretreatment, monomer coating, crosslinking and sputtering steps.

The pre-laminates of the invention are formed by joining a film of the invention to one or more mechanical energy-absorbing layers such as layers 134. The mechanical energy-absorbing layers can be made from a variety of materials that will be familiar to those skilled in the art, including PVB, polyurethanes ("PURs"), polyvinyl chloride, polyvinyl acetal, polyethylene, ethylene vinyl acetates and SUR-LYN™ resins (E. I. duPont de Nemours & Co.). PVB is a preferred material for the mechanical energy-absorbing layer. The thickness of the mechanical energy-absorbing layer will depend upon the desired application, but typically will be about 0.3 to about 1 mm.

Various functional layers or coatings can be added to the films or pre-laminates of the present invention to alter or improve their physical or chemical properties, particularly at the surface of the film or pre-laminate. Such layers or coatings can include, for example, low friction coatings or slip particles to make the film or the pre-laminate easier to handle during the-manufacturing process; particles to add diffusion properties to the film or pre-laminate or to prevent wet-out or Newton's rings when the film or pre-laminate is placed next to another film or surface; adhesives such as pressure sensitive adhesives or hot melt adhesives; primers to promote adhesion to adjacent layers; and low adhesion backsize materials for use when the film or pre-laminate is to be used in adhesive roll form. The functional layers or coatings can also include shatter resistant, anti-intrusion, or puncture-tear resistant films and coatings, for example, the functional layers described in WO 01/96115. Additional functional layers or coatings can include vibration-damping film layers such as those described in WO 98/26927 and U.S. Pat. No. 5,773,102, and barrier layers to provide protection or to alter the transmissive properties of the film or pre-laminate towards liquids such as water or organic solvents or towards gases such as oxygen, water vapor or carbon dioxide. These functional components can be incorporated into one or more of the outermost layers of the film or pre-laminate, or they can be applied as a separate film or coating.

For some applications, it may be desirable to alter the appearance or performance of the film or pre-laminate, such as by laminating a dyed film layer to the film or pre-laminate, applying a pigmented coating to the surface of the film or pre-laminate, or including a dye or pigment in one or more of the materials used to make the film or pre-laminate. The dye or pigment can absorb in one or more selected regions of the spectrum, including portions of the infrared, ultraviolet or visible spectrum. The dye or pigment can be used to complement the properties of the film or pre-laminate, particularly where the film or pre-laminate transmits some frequencies while reflecting others. A particularly useful pigmented layer that can be employed in the films or pre-laminates of the invention is described in WO 2001/58989. This layer can be laminated, extrusion coated or coextruded as a skin layer on the film or pre-laminate. The pigment loading level can be varied between about 0.01 and about 1.0% by weight to vary the visible light transmission as desired. The addition of a UV absorptive cover layer can also be desirable in order to protect any inner layers of the film that may be unstable when exposed to UV radiation.

Additional functional layers or coatings that can be added to the film or pre-laminate include, for example, antistatic coatings or films; flame retardants; UV stabilizers; abrasion resistant or hardcoat materials; optical coatings; anti-fogging materials; magnetic or magneto-optic coatings or films; liquid crystal panels; electrochromic or electroluminescent panels; photographic emulsions; prismatic films; and holographic films or images. Additional functional layers or coatings are described, for example, in WO 97/01440, WO 99/36262, and WO 99/36248.

The film or pre-laminate can be treated with, for example, inks or other printed indicia such as those used to display product identification, orientation information, advertisements, warnings, decoration, or other information. Various techniques can be used to print on the film, such as, for example, screen printing, inkjet printing, thermal transfer printing, letterpress printing, offset printing, flexographic printing, stipple printing, laser printing, and so forth, and various types of ink can be used, including one and two component inks, oxidatively drying and UV-drying inks, dissolved inks, dispersed inks, and 100% ink systems.

The films and pre-laminates of the invention can be joined or laminated to a wide variety of substrates. Typical substrate materials include glazing materials such as glass (which may be insulated, tempered, laminated, annealed, or heat strengthened) and plastics (such as polycarbonates and polymethylmethacrylate). The invention is especially useful in connection with non-planar substrates, especially those having a compound curvature. The films or pre-laminates of the invention preferably are capable of conforming to such non-planar substrates during a lamination and de-airing process without substantial cracking or creasing.

The films of the invention (or the support on which such a film may be formed) can be oriented and optionally heat set under conditions sufficient to assist the film in conforming without substantial wrinkling to a non-planar substrate. This is especially useful when a non-planar substrate to which a film of the invention is to be laminated has a known shape or curvature, and especially when the laminate has a known severe compound curvature. By individually controlling the shrinkage of the film or support in each in-plane direction, the film can be caused to shrink in a controlled fashion during lamination, especially during nip roll lamination. For example, if the non-planar substrate to which the film is to be laminated has a compound curvature, then the shrinkage of the film can be tailored in each in-plane direction to match the specific curvature characteristics of the substrate in those directions. The in-plane film or support direction having the greatest shrinkage preferably is aligned with the dimension of the substrate having the least curvature, that is, the greatest radius of curvature. In addition to or in place of characterizing curvature according to the radius of curvature, other measurements (such as the depth of a raised or depressed area measured from the geometric surface defined by a major surface of the substrate) can also be used if desired. For lamination to typical non-planar substrates, the film shrinkage preferably will be greater than about 0.4% in both in-plane directions, more preferably greater than about 0.7% in at least one in-plane direction, and most preferably greater than about 1% in at least one in-plane direction. The overall film shrinkage preferably is limited to reduce edge delamination or "pull-in." Thus the film shrinkage preferably is less than about 3% in each in-plane direction, and more preferably less than about 2.5% in each in-plane direction. Shrinkage behavior will primarily be governed by factors such as the film or support materials employed, and the film or support stretch ratio(s), heatset temperature, residence time and toe-in (the decrease in rail spacing in a tenter heatset zone measured relative to a maximum rail setting). Coatings can also change the shrinkage properties of a film. For example, a primer coating may reduce the transverse direction ("TD") shrinkage by about 0.2% to about 0.4% and increase the machine direction ("MD") shrinkage by about 0.1 to about 0.3%. Orienting and heat setting equipment can vary widely, and ideal process settings typically are determined experimentally in each case. Further details regarding techniques for manufacturing MOF supports having targeted shrinkage properties are described in WO 01/96104, the disclosure of which is incorporated herein by reference.

As mentioned above, the films of the invention can initially be laminated to a mechanical energy-absorbing layer or layers to form a pre-laminate such as pre-laminate 140 or 150, and then later laminated to a vehicular glazing sheet or sheets. A sandwich containing the film, the mechanical energy-absorbing layer or layers and the glazing sheet or sheets can also be assembled in a single lamination step. In either case, air should be removed from between the various layers during each lamination step. In general it will be preferable to preheat the film and mechanical energy-absorbing layer or layers in an oven to a temperature below the Tg of the outermost film layer prior to lamination.

Preferably, some level of adhesion should be established between the mechanical energy-absorbing layer or layers, the film and the glazing sheet or sheets. However, the mechanical energy-absorbing layer or layers preferably should not become sufficiently soft to flow before the final lamination step takes place. The mechanical energy-absorbing layer or layers preferably should help to tack the edges of the pre-laminate in position so that the film can shrink and form itself to the shape of the completed laminate. The laminate preferably is cooled at a controlled rate after autoclaving to avoid possible wrinkling within the film or delamination at the edges of the film. De-airing can be accelerated using the vacuum de-airing or nip roll processes described above. Preferably de-airing and lamination are carried out using one or more nip rollers. A representative nip roll apparatus is shown in U.S. Pat. No. 5,085,141. Other such devices will be familiar to those skilled in the art.

Following lamination, the laminate preferably is heated in an autoclave to a temperature sufficient to cause the mechanical energy-absorbing layer or layers and the film of the invention to conform to the contours of the glazing sheet or sheets and form a final laminated glazing article. Sufficient pressure should also be applied during lamination to obtain at least partial bonding of the various layers of the laminate. For laminates containing PVB, temperatures of about 138° C. to about 150° C. and pressures of about 0.5 to about 1.5 MPa are typical. The heat and pressure cause the mechanical energy-absorbing layer or layers to flow and spread to fill up voids, form a uniform sandwich construction, and firmly bond the laminate layers together, while removing residual air (or dissolving it in the PVB) in a minimal time frame. Although autoclave cycles can vary significantly, depending on the manufacturer, one typical autoclave cycle involves (a) increasing the temperature and pressure from ambient to about 93° C. and about 0.55 MPa within about 15 minutes, (b) increasing temperature to about 143° C. while holding the pressure at about 0.55 MPa within about 40 minutes, (c) increasing the pressure to about 1.38 MPa while holding the temperature at about 143° C. within about 10 minutes, (d) holding at this maximum temperature and pressure for about 20 minutes, (e) decreasing the temperature and the pressure to about 38° C. and about 1 MPa within about 15 minutes, and (f) decreasing the pressure to ambient within about 4 minutes. The entire autoclave cycle is typically about 60 minutes to about 120 minutes.

Figure 9:
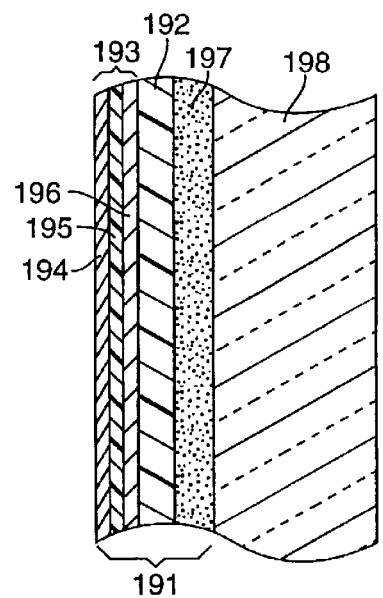
FIG. 9 is a schematic cross-sectional view of architectural glazing of the invention.

The films of the invention can also be employed in architectural glazing, e.g., such as the glazing articles described in U.S. Pat. No. 4,799,745. The manner of making such glazing articles will be apparent to those skilled in the art. For example, useful architectural glazing articles can be made by substituting a crosslinked polymeric spacing layer for the spacing layer 18 in U.S. Pat. No. 4,799,745. The finished glazing articles of the present invention preferably are optically clear. FIG. 9 shows a film 191 of the invention containing substrate 192 and Fabry-Perot stack 193 containing first and second metal layers 194 and 196 separated by spacing layer 195. Film 191 is joined to a glass sheet 198 using a layer 197 of pressure sensitive adhesive.

The films of the invention can be manufactured much more rapidly than films made using a sputter-coated inorganic dielectric layer or a solvent-applied uncrosslinked polymeric dielectric layer. In the latter two processes the dielectric layer deposition step is a rate-limiting factor, whereas the process of the invention enables much more rapid deposition of the dielectric layer. In addition, the process of the invention can be carried out in a single chamber without removal of the film between coating steps, whereas the reported solvent-applied uncrosslinked dielectric layers appear to have been formed outside the chamber in which deposition of the metal layers took place.

The following tests were used to evaluate films of the invention:

Corrosion Test

Two strips 25.4 mm wide by about 254 to 305 mm long were cut from the center of a film sample. The strips were placed in jars containing 20% KCl solution at room temperature so that about 150 to 200 mm of each strip was immersed into the salt solution. The jar tops were screwed onto the jars to prevent the salt solution from evaporating. The strips were removed after 15 minutes of immersion, placed support side down on a dry paper towel and wiped with tissue or a paper towel along the width of the strip. Medium pressure was applied while wiping. The strips were next washed with cold water to remove salt from the surface and the film surface appearance was observed. The appearance rating was based on a visual estimate of the amount of the metal layer removed after wiping the strip, expressed as a percentage of the original metal layer area.

Adhesion Test

Squares about 254 mm wide by about 254 mm long were cut from the center of a film sample. 25.4 mm wide by 178 mm long pieces of masking tape and filament tape were applied to the film in the MD and TD directions, pressed with a 2.3 kg roller, then aged at room temperature for one week. The adhesion test rating was based on a visual estimate of the amount of the metal layer remaining after peeling away the tapes, expressed as a percentage of the original metal layer area.

Conductivity vs. Strain Test

Films of the invention were stretched using SINTECH™ 200/S TENSILE TESTER (Instron Corp.) in order to determine the percent strain at which the film would stop conducting electricity. A 25.4 mm wide by about 200 mm long strip was cut from the center of a film sample. The narrow ends of the strip were painted on both sides with No. 22-201 silver paint (Katy Company). After the silver paint dried, copper was folded over the painted edges to form a durable electrode at each end of the strip. The prepared strips were clamped into the jaws of the tensile tester, and alligator clips were used to connect a power supply to the copper electrodes. While using a gauge length of 101.6 mm and a crosshead speed of 25.4 mm/min, a constant voltage of 4 volts was supplied to the strip and the current flow was measured and recorded vs. % strain.

Sheet Resistance Test

Films of the invention were evaluated for sheet resistance using a non-contact conductivity measuring device (Model 717B Benchtop Conductance Monitor, Delcom Instruments Inc.).

Solar Heat Gain Coefficient and Shading Coefficient

The value Te is defined as the ratio, expressed in percent, of the solar energy transmitted by a specimen from 250 nm to 2500 nm divided by the total incident solar energy. The value Ae is defined as the ratio, expressed in percent, of the solar energy absorbed by a specimen from 250 nm to 2500 nm divided by the total incident solar energy. Solar properties are calculated using solar irradiance data from ASTM E891 using air mass 1.5. The Solar Heat Gain Coefficient (SHGC) is calculated as $$SHGC = Te + 0.27(Ae).$$

The Shading Coefficient (SC) is defined as the ratio of the Solar Heat Gain Coefficient through a given glazing to that through a single pane of standard 3.2 mm thick window glass, and is calculated as $$SC = SHGC/87.0.$$

The invention will now be described with reference to the following non-limiting examples, in which all parts and percentages are by weight unless otherwise indicated.

EXAMPLE 1

(Layer 1) An approximately 300 meter long roll of 0.05 mm thick by 508 mm wide PET support (453 MELINEX™, DuPont Teijin Films) was loaded into a roll to roll vacuum chamber like that shown in FIG. 8. The pressure in the vacuum chamber was reduced to $3 \times 10^{-4}$ torr. The support was simultaneously plasma pretreated and acrylate coated at a web speed of 36.6 m/min. The plasma pretreatment utilized a chrome target and an unbalanced dc magnetron operated at 1500 watts power (429 volts and 3.5 amps) under a nitrogen atmosphere with a nitrogen gas flow of 70 sccm. The acrylate coating employed a 50:50 mixture of IRR214 acrylate (UCB Chemicals) and lauryl acrylate that had been degassed for 1 hour by placing a container of the liquid monomer mixture into a bell jar and reducing pressure to approximately 1 millitorr. The degassed monomer was pumped at a flow rate of 2.35 ml/min through an ultrasonic atomizer into a vaporization chamber maintained at 274° C. Using a drum temperature of −18° C., the monomer vapor was condensed onto the moving web and electron beam crosslinked using a single filament gun operated at 7.59 kV and 2.0 milliamps.

(Layer 2) The web direction was reversed. Again operating at 36.6 m/min, the acrylate surface was plasma treated and coated with magnetron sputtered silver. The plasma pretreatment was as before but at 413 volts and 3.64 amps. The silver was sputtered at 10,000 watts power (590 volts and 16.96 amps), a drum temperature of 25° C. and an argon atmosphere with an argon gas flow of 90 sccm.

(Layer 3) The web direction was again reversed. Again operating at 36.6 m/min, a crosslinked spacing layer was formed using the monomer mixture described above, but without plasma pretreatment of the silver surface prior to monomer deposition. Using a drum temperature of −17° C. and the other monomer deposition conditions described above, the monomer vapor was condensed onto the moving web and electron beam crosslinked using a single filament gun operated at 7.8 kV and 3.8 milliamps.

(Layer 4) The web direction was again reversed. Again operating at 36.6 m/min, the crosslinked spacing layer was plasma pretreated and coated with magnetron sputtered silver. The plasma pretreatment was as before but using 429 volts and 3.5 amps. The silver was sputtered as before but at 590 volts, 16.94 amps, and a drum temperature of 22° C.

(Layer 5) The web direction was again reversed. A protective layer was formed using the monomer mixture described above, but without plasma pretreatment of the silver surface prior to monomer deposition. Using a drum temperature of −17° C. and the other monomer deposition conditions described above, the monomer vapor was condensed onto the moving web and electron beam crosslinked using a single filament gun operated at 10.11 kV and 3.8 milliamps.

Figure 10:
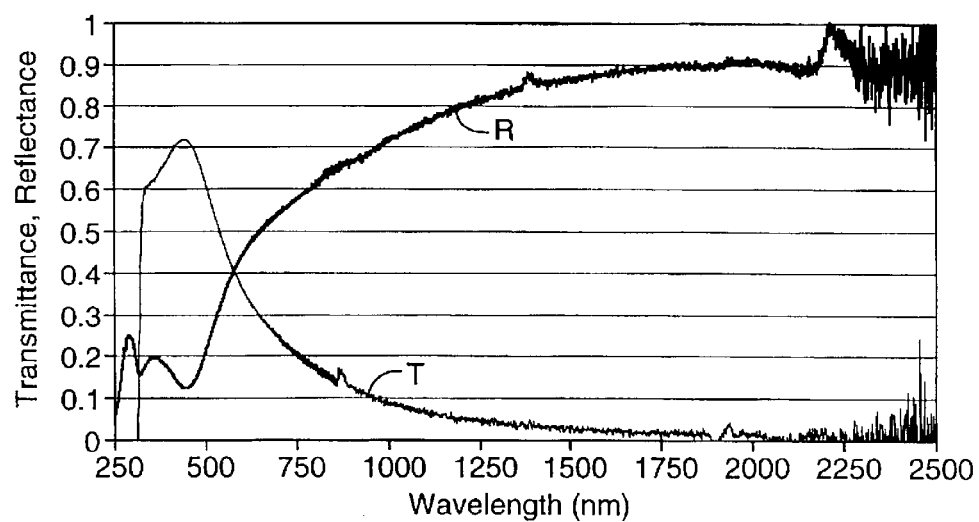
FIG. 10 and FIG. 11 are graphs showing transmittance and reflectance for two films of the invention.

The optical properties of the resulting 5 layer infrared-rejecting acrylate/Ag/acrylate/Ag/acrylate optical stack are shown in FIG. 10. Curves T and R respectively show the transmission and reflection for the finished film. Using optical modeling and assuming a Bruggerman density for silver of 0.97, the five layers had calculated thicknesses of 120 nm (acrylate layer 1)/12 nm (Ag layer 2)/85 nm (acrylate layer 3)/12 nm (Ag layer 4)/120 nm (acrylate layer 5).

EXAMPLE 2

Using the method of Example 1, a PET support was covered with a five layer acrylate/Ag/acrylate/Ag/acrylate optical stack, but using plasma pretreatment on both the top and bottom of the metal layers. The individual layer differences were as follows:

(Layer 1) The support plasma pretreatment was as before but at 1000 watts power (402 volts and 2.5 amps) and a nitrogen gas flow of 102 sccm. The monomer flow rate was 2.45 ml/min and the vaporization chamber temperature was 276° C. The monomer vapor was condensed onto the moving web using a −21° C. drum temperature. The electron beam filament was operated at 8.0 kV and 6.5 milliamps.

(Layer 2) The plasma pretreatment was at 1000 watts power (309 volts and 3.34 amps) and a nitrogen gas flow of 90 sccm. The silver was sputtered at 570 volts and 17.88 amps, a drum temperature of 21° C. and an argon gas flow of 93.2 sccm.

(Layer 3) The silver surface was plasma pretreated prior to deposition of the spacing layer. The plasma pretreatment utilized a chrome target and 1000 watts power (308 volts and 3.33 amps). Using a drum temperature of −23° C., the monomer vapor was condensed onto the moving web and electron beam crosslinked using a single filament gun operated at 8.0 kV and 6.0 milliamps.

(Layer 4) The plasma pretreatment was at 316 volts and 3.22 amps, and the nitrogen gas flow rate was 90 sccm. The silver was sputtered at 567 volts and 17.66 amps, a drum temperature of 20° C., and an argon gas flow of 95.5 sccm.

(Layer 5) The silver surface was plasma pretreated prior to deposition of the protective layer. The plasma pretreatment was the same as in Layer 3. Using a drum temperature of −23° C., the monomer vapor was condensed onto the moving web and electron beam crosslinked using a single filament gun operated at 8.0 kV and 6.2 milliamps.

Figure 11:
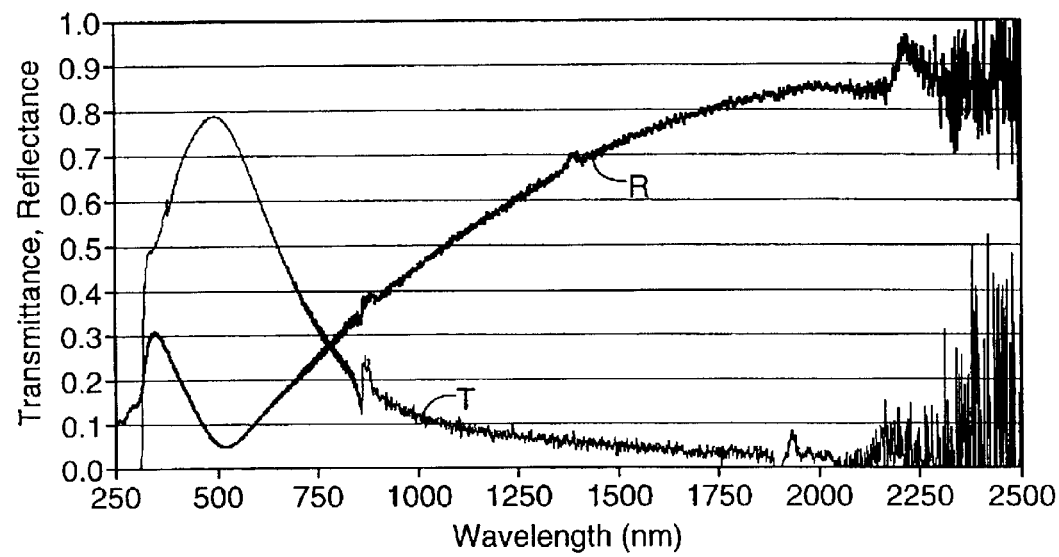

The optical properties of the resulting 5 layer infrared-rejecting acrylate/Ag/acrylate/Ag/acrylate optical stack are shown in FIG. 11. Curves T and R respectively show the transmission and reflection for the finished film. Using optical modeling and assuming a Bruggerman density for silver of 0.97, the five layers had calculated thicknesses of 120 nm (acrylate layer 1)/9 nm (Ag layer 2)/95 nm (acrylate layer 3)/9 nm (Ag layer 4)/120 nm (acrylate layer 5).

EXAMPLES 3–5

Using the method of Example 2, 5 layer infrared-rejecting acrylate/Ag/acrylate/Ag/acrylate optical stacks were formed on a PET support. The resulting films were evaluated for appearance, transmission (Trans-Luminous Y ($T_{vis}$)), reflection (Refl-Luminous Y), solar heat gain coefficient, shading coefficient and corrosion resistance. The processing conditions and evaluation results are set out below in Table 1, along with results for the films of Examples 1 and 2.

TABLE 1

|  | Ex.1 | Ex.2 | Ex.3 | Ex.4 | Ex.5 |
|---|---|---|---|---|---|
| Layer 1 | | | | | |
| Deposited material | Monomers | Monomers | Monomers | Monomers | Monomers |
| Line speed (m/min) | 36.6 | 36.6 | 36.6 | 36.6 | 36.6 |
| Plasma (Watts) | 1500 | 1000 | 1500 | 1000 | 1000 |
| Drum temp(° C.) | −18 | −21 | −18 | −21 | −19 |
| Monomer feed (ml/min) | 2.35 | 2.45 | 2.35 | 2.45 | 2.45 |
| Layer 2 | | | | | |
| Deposited material | Ag | Ag | Ag | Ag | Ag |
| Line speed (m/min) | 36.6 | 36.6 | 30.5 | 38.1 | 36.6 |
| Plasma (Watts) | 1500 | 1000 | 1500 | 1000 | 1000 |
| Drum temp (° C.) | 25 | 22 | 25 | 22 | 19 |
| Sputter power (KW) | 10 | 10 | 10 | 10 | 10 |
| Layer 3 | | | | | |
| Deposited material | Monomers | Monomers | Monomers | Monomers | Monomers |
| Line speed (m/min) | 36.6 | 36.6 | 36.6 | 36.6 | 36.6 |
| Plasma (Watts) | 0 | 1000 | 0 | 1000 | 1000 |
| Drum temp(° C.) | −17 | −23 | −17 | −23 | −19 |
| Monomer feed (ml/min) | 2.35 | 2.45 | 2.35 | 2.45 | 2.45 |
| Layer 4 | | | | | |
| Deposited material | Ag | Ag | Ag | Ag | Ag |
| Line speed (m/min) | 36.6 | 36.6 | 30.5 | 38.1 | 36.6 |
| Plasma (Watts) | 1500 | 1000 | 1500 | 1000 | 1000 |
| Drum temp (° C.) | 22 | 22 | 22 | 22 | 23 |
| Sputter power (KW) | 10 | 10 | 10 | 10 | 10 |
| Layer 5 | | | | | |
| Deposited material | Monomers | Monomers | Monomers | Monomers | Monomers |
| Line speed (m/min) | 36.6 | 36.6 | 36.6 | 36.6 | 36.6 |
| Plasma (Watts) | 0 | 1000 | 0 | 1000 | 1000 |
| Drum temp (° C.) | −17 | −23 | −17 | −23 | −18 |
| Monomer feed (ml/min) | 2.35 | 2.45 | 2.35 | 2.45 | 1.25 |
| Results: | | | | | |
| Appearance | Splotchy/ surface scratches | Good | Splotchy/ surface scratches | Good | Good |
| Trans-Luminous Y ($T_{vis}$) | 48 | 69.9 | 56.1 | 63.11 | 72.35 |
| Refl-Luminous Y | 33.8 | 8.04 | 25.5 | 11.58 | 5.62 |
| SHGC | 31.25 | 44.24 | 28.03 | 41.96 | 46.06 |
| SC | 0.3592 | 0.5085 | 0.3221 | 0.4823 | 0.5295 |
| Corrosion | 100% | 0% | 100% | 0% | 0% |

The results in Table 1 show that the films of the invention provided significant infrared rejection. The use of plasma pretreatment on both sides of the silver layers also yielded much better corrosion-resistance than plasma pretreatment on only one side of the silver layers.

EXAMPLES 6–9

Using the method of Examples 3 through 5, 5 layer infrared-rejecting acrylate/Ag/acrylate/Ag/acrylate optical stacks with acrylate layers of varying thickness were formed on a PET support. The resulting films were evaluated for appearance, transmission, reflection, solar heat gain coefficient, shading coefficient and sheet resistivity. The processing conditions and evaluation results are set out below in Table 2, along with the results for the film of Example 5.

TABLE 2

|  | Ex.5 | Ex.6 | Ex.7 | Ex.8 | Ex.9 |
|---|---|---|---|---|---|
| Layer 1 | | | | | |
| Deposited material | Monomers | Monomers | Monomers | Monomers | Monomers |
| Line speed (m/min) | 36.6 | 36.6 | 36.6 | 36.6 | 36.6 |
| Plasma (Watts) | 1000 | 1000 | 1000 | 1000 | 1000 |
| Drum temp (° C.) | −19 | −18 | −18 | −18 | −18 |
| Monomer feed (ml/min) | 2.45 | 2.85 | 2.85 | 2.85 | 2.85 |
| Layer 2 | | | | | |
| Deposited material | Ag | Ag | Ag | Ag | Ag |
| Line speed (m/min) | 36.6 | 36.6 | 36.6 | 36.6 | 36.6 |

TABLE 2-continued

|  | Ex.5 | Ex.6 | Ex.7 | Ex.8 | Ex.9 |
|---|---|---|---|---|---|
| Plasma (Watts) | 1000 | 1000 | 1000 | 1000 | 1000 |
| Drum temp (° C.) | 19 | 24 | 24 | 24 | 24 |
| Sputter power (KW) | 10 | 10 | 10 | 10 | 10 |
| Layer 3 | | | | | |
| Deposited material | Monomers | Monomers | Monomers | Monomers | Monomers |
| Line speed (m/min) | 36.6 | 36.6 | 36.6 | 36.6 | 36.6 |
| Plasma (Watts) | 1000 | 1000 | 1000 | 1000 | 1000 |
| Drum temp (° C.) | −19 | −22 | −22 | −22 | −22 |
| Monomer feed (ml/min) | 2.45 | 2.65 | 2.75 | 2.85 | 2.95 |
| Layer 4 | | | | | |
| Deposited material | Ag | Ag | Ag | Ag | Ag |
| Line speed (m/min) | 36.6 | 36.6 | 36.6 | 36.6 | 36.6 |
| Plasma (Watts) | 1000 | 1000 | 1000 | 1000 | 1000 |
| Drum temp (° C.) | 23 | 22 | 22 | 22 | 22 |
| Sputter power (KW) | 10 | 10 | 10 | 10 | 10 |
| Layer 5 | | | | | |
| Deposited material | Monomers | Monomers | Monomers | Monomers | Monomers |
| Line speed (m/min) | 36.6 | 36.6 | 36.6 | 36.6 | 36.6 |
| Plasma (Watts) | 1000 | 1000 | 1000 | 1000 | 1000 |
| Drum temp(° C.) | −18 | −21 | −21 | −21 | −21 |
| Monomer feed (ml/min) | 1.25 | 1.45 | 1.45 | 1.45 | 1.45 |
| Results: | | | | | |
| Appearance | Good | Good | Good | Good | Good |
| Trans-Luminous Y ($T_{vis}$) | 72.35 | 72.23 | 70.93 | 68.31 | 66.03 |
| Refl-Luminous Y | 5.62 | 10.72 | 12.27 | 16.76 | 19.6 |
| SHGC | 46.06 | 47.30 | 47.43 | 47.36 | 47.22 |
| SC | 0.5295 | 0.5436 | 0.5452 | 0.5443 | 0.5428 |
| Sheet Resistivity (Ohms/Square) | 4.532 | 4.399 | 4.552 | 4.525 | 4.454 |

The results in Table 2 show the use of varying monomer feed rates to alter the thickness of the crosslinked polymeric spacing layer. The alterations affected the measured $T_{vis}$. Films having a $T_{vis}$ as high as 72% and sheet resistance as low as 4.4 Ohms/square were obtained.

EXAMPLES 10–12

Using the method of Examples 3 through 5, 5 layer infrared-rejecting acrylate/Ag/acrylate/Ag/acrylate optical stacks with silver layers of varying thickness were formed on a PET support. The resulting films were evaluated for appearance, transmission, reflection, solar heat gain coefficient, shading coefficient and sheet resistivity. The processing conditions and evaluation results are set out below in Table 3.

TABLE 3

|  | Ex. 10 | Ex. 11 | Ex. 12 |
|---|---|---|---|
| Layer 1 | | | |
| Deposited material | Monomers | Monomers | Monomers |
| Line speed (m/min) | 36.6 | 36.6 | 36.6 |
| Plasma (Watts) | 1000 | 1000 | 1000 |
| Drum temp(° C.) | −21 | −21 | −21 |
| Monomer feed (ml/min) | 2.65 | 2.65 | 2.65 |
| Layer 2 | | | |
| Deposited material | Ag | Ag | Ag |
| Line speed (m/min) | 35.1 | 36.6 | 38.1 |
| Plasma (Watts) | 1000 | 1000 | 1000 |
| Drum temp (° C.) | 26 | 26 | 26 |
| Sputter power (KW) | 10 | 10 | 10 |
| Layer 3 | | | |
| Deposited material | Monomers | Monomers | Monomers |
| Line speed (m/min) | 36.6 | 36.6 | 36.6 |
| Plasma (Watts) | 1000 | 1000 | 1000 |
| Drum temp(° C.) | −19 | −19 | −19 |
| Monomer feed (ml/min) | 2.65 | 2.65 | 2.65 |
| Layer 4 | | | |
| Deposited material | Ag | Ag | Ag |
| Line speed (m/min) | 35.1 | 36.6 | 38.1 |
| Plasma (Watts) | 1000 | 1000 | 1000 |
| Drum temp (° C.) | 28 | 28 | 28 |
| Sputter power (KW) | 10 | 10 | 10 |
| Layer 5 | | | |
| Deposited material | Monomers | Monomers | Monomers |
| Line speed (m/min) | 36.6 | 36.6 | 36.6 |
| Plasma (Watts) | 1000 | 1000 | 1000 |
| Drum temp(° C.) | −18 | −18 | −18 |
| Monomer feed (ml/min) | 1.35 | 1.35 | 1.35 |
| Results: | | | |
| Appearance | Good | Good | Good |
| Trans-Luminous Y ($T_{vis}$) | 72.37 | 72.14 | 71.53 |
| Refl-Luminous Y | 12.36 | 10.92 | 11.18 |
| SHGC | 46.28 | 46.84 | 48.04 |
| SC | 0.5320 | 0.5384 | 0.5522 |
| Sheet Resistivity (Ohms/Square) | 3.929 | 4.505 | 4.673 |

Figure 12:
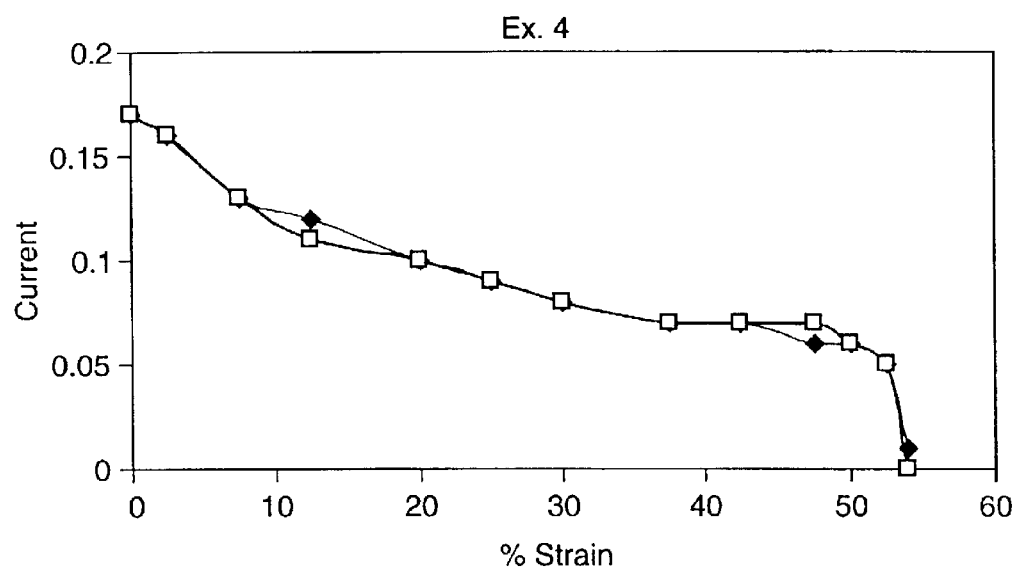
FIG. 12 through FIG. 14 are graphs showing conductance vs. strain for three films of the invention.
Figure 13:
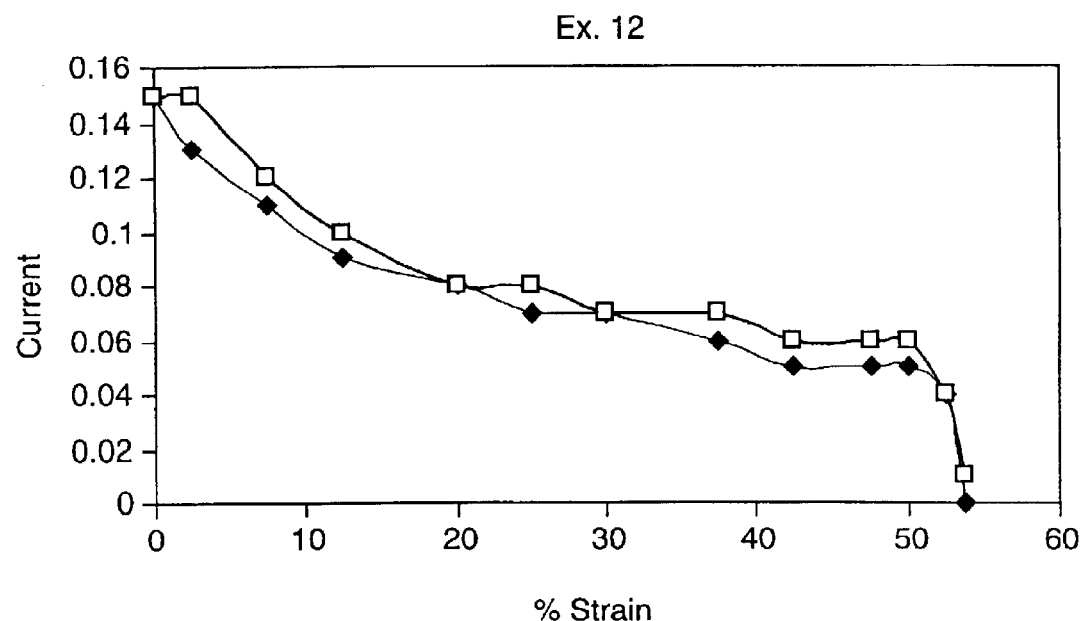

The results in Table 3 show the use of varying line speeds to alter the thickness of the metal layers. Films having a $T_{vis}$ as high as 72% and sheet resistance as low as 3.9 Ohms/square were obtained. Two samples each of the films of Examples 11 and 12 were also evaluated using the conductivity vs. strain test. The results are shown in FIG. 12 and FIG. 13, respectively. All film samples conducted current at up to 50% or more strain. The results in FIG. 12 and FIG. 13 also demonstrate that the films of the invention could be used as transparent strain gauges.

COMPARATIVE EXAMPLE 1

A commercial product based on transparent silver layers and an indium oxide inorganic dielectric (XIR™ 75 film, Southwall Technologies Inc.) was evaluated using the conductivity vs. strain test. The sample failed when subjected to only 1% strain.

EXAMPLES 13–18

Using the method of Examples 3 through 5, 5 layer infrared-rejecting acrylate/Ag/acrylate/Ag/acrylate optical stacks with protective topcoats of varying thickness and an optional topcoat plasma post-treatment were formed on a PET support (Examples 13–16) or a birefringent multilayer optical film support (3M™ Solar Reflecting Film No. 41-4400-0146-3, Examples 17–18). The resulting films were evaluated for appearance, transmission, reflection, solar heat gain coefficient, shading coefficient and sheet resistivity. The processing conditions and evaluation results are set out below in Table 4.

TABLE 4

|  | Ex.13 | Ex.14 | Ex.15 | Ex.16 | Ex.17 | Ex.18 |
| --- | --- | --- | --- | --- | --- | --- |
| Support | PET | PET | PET | PET | MOF | MOF |
| Layer 1 | | | | | | |
| Deposited material | Monomers | Monomers | Monomers | Monomers | Monomers | Monomers |
| Line speed (m/min) | 36.6 | 36.6 | 36.6 | 36.6 | 36.6 | 36.6 |
| Plasma (Watts) | 1000 | 1000 | 1000 | 1000 | 1000 | 1000 |
| Drum temp(° C.) | −21 | −21 | −21 | −21 | −21 | −21 |
| Monomer feed (ml/min) | 2.65 | 2.65 | 2.65 | 2.65 | 2.65 | 2.65 |
| Layer 2 | | | | | | |
| Deposited material | Ag | Ag | Ag | Ag | Ag | Ag |
| Line speed (m/min) | 36.6 | 36.6 | 36.6 | 36.6 | 36.6 | 36.6 |
| Plasma (Watts) | 1000 | 1000 | 1000 | 1000 | 1000 | 1000 |
| Drum temp(° C.) | 26 | 26 | 26 | 26 | 19 | 19 |
| Sputter power (KW) | 10 | 10 | 10 | 10 | 10 | 10 |
| Layer 3 | | | | | | |
| Deposited material | Monomers | Monomers | Monomers | Monomers | Monomers | Monomers |
| Line speed (m/min) | 36.6 | 36.6 | 36.6 | 36.6 | 36.6 | 36.6 |
| Plasma (Watts) | 1000 | 1000 | 1000 | 1000 | 1000 | 1000 |
| Drum temp(° C.) | −19 | −19 | −19 | −19 | −20 | −20 |
| Monomer feed (ml/min) | 2.65 | 2.65 | 2.65 | 2.65 | 2.85 | 2.85 |
| Layer 4 | | | | | | |
| Deposited material | Ag | Ag | Ag | Ag | Ag | Ag |
| Line speed (m/min) | 36.6 | 36.6 | 36.6 | 36.6 | 36.6 | 36.6 |
| Plasma (Watts) | 1000 | 1000 | 1000 | 1000 | 1000 | 1000 |
| Drum temp (° C.) | 28 | 28 | 28 | 28 | 23 | 23 |
| Sputter power (KW) | 10 | 10 | 10 | 10 | 10 | 10 |
| Layer 5 | | | | | | |
| Deposited material | Monomers | Monomers | Monomers | Monomers | Monomers | Monomers |
| Line speed (m/min) | 36.6 | 36.6 | 36.6 | 36.6 | 36.6 | 36.6 |
| Plasma (Watts) | 1000 | 1000 | 1000 | 1000 | 1000 | 1000 |
| Drum temp (° C.) | −18 | −18 | −18 | −18 | −17 | −17 |
| Monomer feed (ml/min) | 1.45 | 1.25 | 1.35 | 1.35 | 1.35 | 1.35 |
| Plasma Post-Treatment | | | | | | |
| Line speed (m/min) | | | 36.6 | 36.6 | | 36.6 |
| Plasma (Watts) | | | 1500 | 1000 | | 1000 |
| Results: | | | | | | |
| Appearance | Good | Good | Good | Good | Good | Good |
| Trans-Luminous Y ($T_{vis}$) | 71.51 | 70.09 | 68.19 | 72.59 | 72.69 | 72.51 |
| Refl-Luminous Y | 11.73 | 12.02 | 11.86 | 7.75 | 11.16 | 10.15 |
| SHGC | 46.60 | 46.25 | 44.82 | 46.81 | 44.97 | 45.63 |
| SC | 0.5356 | 0.5316 | 0.5152 | 0.5381 | 0.5169 | 0.5244 |
| Sheet Resistivity (Ohms/Square) | 4.23 | 4.38 | 5.709 | 5.208 | 3.927 | 4.389 |

Figure 14:
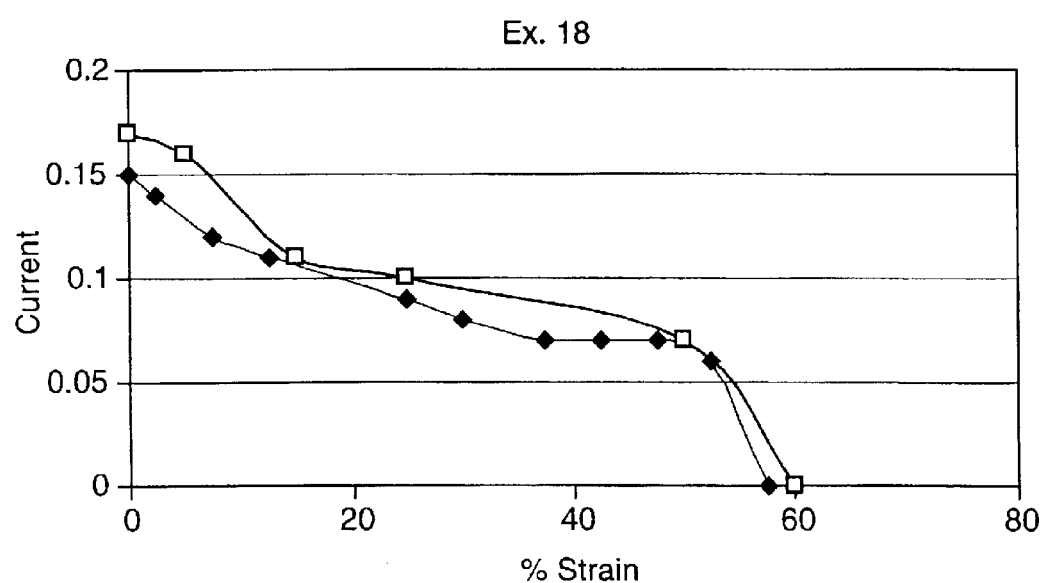

The results in Table 4 show the use of two different substrates, varying protective topcoat thickness and an optional plasma post-treatment of the topcoat. Films having a $T_{vis}$ as high as about 73% and sheet resistance as low as 3.9 Ohms/square were obtained. Two samples of the film of Example 18 were also evaluated using the conductivity vs. strain test. The results are shown in FIG. 14. Both film samples conducted current at up to 50% or more strain.

EXAMPLE 19

Two 508 mm wide pieces of the film of Example 6 were placed side-by-side between two 0.38 mm thick SAFLEX™ IIIG Grade AR PVB sheets (Solutia, Inc.). The resulting sandwich was placed between the inner and outer glass sheets of a No. DW1224 Chrysler minivan windshield having compound curved corners. The resulting laminate assembly was de-aired using a vacuum de-airing ring, then autoclaved to form an optically clear windshield assembly. The assembly was defect-free as determined by visual inspection except for the seam between the two film samples. Use of a wider coated film sample would have eliminated the seam.

EXAMPLE 20

Using the method of Example 2, a PET support was covered with a five layer acrylate/Ag/acrylate/Ag/acrylate optical stack, but using plasma pretreatment on both the top and bottom of the metal layers. The individual layer differences were as follows:

(Layer 1) The support plasma pretreatment was at 1000 watts power but using 322 volts, 3.15 amps and a nitrogen gas flow of 70 sccm. The monomer flow rate was 2.65 ml/min and the vaporization chamber temperature was 274° C. The monomer vapor was condensed onto the moving web using a −20° C. drum temperature. The electron beam filament was operated at 8.04 kV and 5.7 milliamps.

(Layer 2) The plasma pretreatment was at 1000 watts power but using 378 volts, 3.09 amps and a nitrogen gas flow of 70 sccm. The silver was sputtered at 547 volts, 18.36 amps, a drum temperature of 26° C. and an argon gas flow of 70 sccm.

(Layer 3) The plasma pretreatment was at 1000 watts power but using 327 volts and 3.1 amps. The monomer vapor was condensed onto the moving web using a drum temperature of −19° C. The electron beam filament was operated at 8.04 kV and 6.3 milliamps.

(Layer 4) The plasma pretreatment was at 1000 watts power but using 328 volts, 3.07 amps and a nitrogen gas flow rate of 70 sccm. The silver was sputtered at 546 volts, 18.34 amps, a drum temperature of 28° C., and an argon gas flow of 70 sccm.

(Layer 5) The plasma pretreatment was at 1000 watts power but using 359 volts and 2.82 amps. The monomer vapor was condensed onto the moving web using a drum temperature of −18° C. The electron beam filament was operated at 8.04 kV and 4.6 milliamps.

Figure 15:
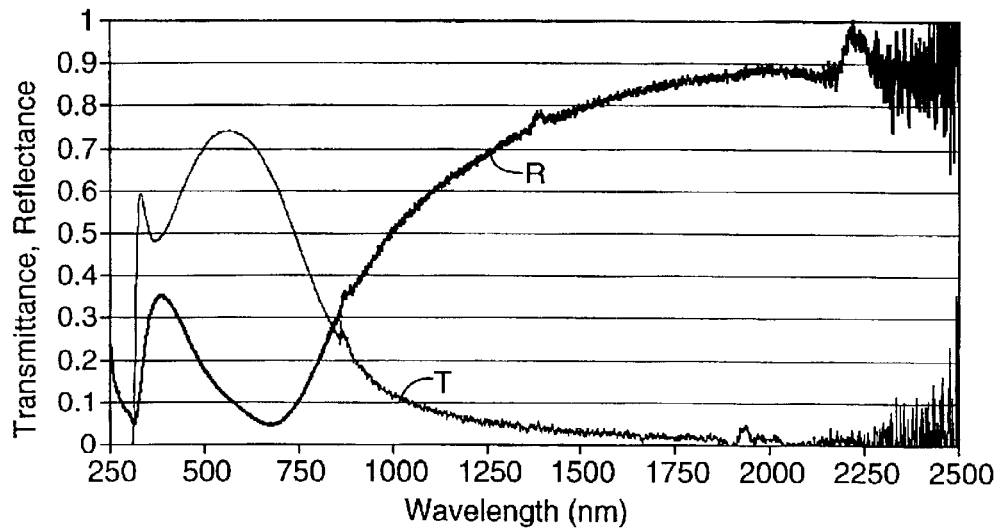
FIG. 15 and FIG. 16 are graphs showing transmittance and reflectance for two films of the invention.

The optical properties of the resulting 5 layer infrared-rejecting acrylate/Ag/acrylate/Ag/acrylate optical stack are shown in FIG. 15. Curves T and R respectively show the transmission and reflection for the finished film. The film had a $T_{vis}$ of 71.5%. The film was next cut into a 30.5 cm by 2.54 cm strip. The edges were painted with a silver conductive paint (SILVER PRINT™, G. C. Thorsen Inc.). A 2.54 cm by 2.54 cm copper foil was folded over each of the opposing narrow ends of the strip and connected using test leads equipped with alligator clips to a 0–20 volt power supply (model 6253A dual DC, Hewlett Packard, Inc.). A voltage was applied to the strip and the current and strip temperature were measured as a function of time. When the strip temperature stopped increasing, a higher voltage was applied. The results are shown below in Table 5.

TABLE 5

| Time (min) | Volts | Amps | Power (W) | Power (W/cm²) | Temp (° C.) |
|---|---|---|---|---|---|
| 0 | 0 | 0 | — | — | 23.4 |
| 1 | 16 | 0.265 | 4.24 | 0.0548 | 51.3 |
| 2 | 16 | 0.265 | 4.24 | 0.0548 | 54 |
| 3 | 16 | 0.265 | 4.24 | 0.0548 | 55.4 |
| 4 | 16 | 0.265 | 4.24 | 0.0548 | 56.4 |
| 6 | 16 | 0.265 | 4.24 | 0.0548 | 57.8 |
| 10 | 16 | 0.265 | 4.24 | 0.0548 | 58.8 |
| 11 | 20 | 0.34 | 6.8 | 0.0878 | 69.9 |
| 12 | 20 | 0.34 | 6.8 | 0.0878 | 73.1 |
| 15 | 20 | 0.34 | 6.8 | 0.0878 | 75.6 |
| 17 | 20 | 0.34 | 6.8 | 0.0878 | 76.4 |
| 19 | 20 | 0.34 | 6.8 | 0.0878 | 76.3 |
| 21 | 24 | 0.42 | 10.08 | 0.1302 | 103.1 |
| 22 | 24 | 0.42 | 10.08 | 0.1302 | 99.8 |
| 23 | 24 | 0.42 | 10.08 | 0.1302 | 103.5 |
| 25 | 24 | 0.42 | 10.08 | 0.1302 | 105.4 |
| 29 | 24 | 0.42 | 10.08 | 0.1302 | 106.9 |
| 33 | 24 | 0.42 | 10.08 | 0.1302 | 107.4 |
| 34 | 24 | 0.42 | 10.08 | 0.1302 | 107.4 |

The results in Table 5 show that the film could withstand very high power densities and very high temperatures without circuit failure. The strip was allowed to cool and then 16 volts were applied to the strip, resulting in a measured current of 0.27 amps. The film became warm to the touch. The film was next creased over the edge of a counter top at a 45° angle, and then at a 90° angle. The film still felt warm to the touch and the current remained at 0.27 amps. The film was next creased at a 180° angle. The sample still felt warm to the touch and the current remained at 0.27 amps. Had cracking occurred, hot spots would have arisen in the film and a substantial current change (or a complete cessation of current flow) would have been observed.

COMPARATIVE EXAMPLE 2

Using the voltage application method of Example 20, a sample of XIR™ 75 film (southwall Technologies Inc.) was powered and heated. The sample failed when subjected to 24 volts or when bent. The results are set out below in Table 6.

TABLE 6

| Time (min) | Volts | Amps | Power (W) | Power (W/cm²) | Temp (° C.) |
|---|---|---|---|---|---|
| 0 | 8 | 0.122 | 0.976 | 0.0130 | 23.1 |
| 2 | 8 | 0.122 | 0.976 | 0.0130 | 32.3 |
| 4 | 8 | 0.122 | 0.976 | 0.0130 | 33 |
| 6 | 8 | 0.122 | 0.976 | 0.0130 | 33.4 |
| 7 | 8 | 0.122 | 0.976 | 0.0130 | 33.6 |
| 8 | 8 | 0.122 | 0.976 | 0.0130 | 33.4 |
| 10 | 12 | 0.182 | 2.184 | 0.0291 | 41.7 |
| 11 | 12 | 0.182 | 2.184 | 0.0291 | 42.5 |
| 12 | 12 | 0.182 | 2.184 | 0.0291 | 43 |
| 13 | 12 | 0.182 | 2.184 | 0.0291 | 43.1 |
| 14 | 12 | 0.182 | 2.184 | 0.0291 | 43.5 |
| 15 | 12 | 0.182 | 2.184 | 0.0291 | 43.6 |
| 16 | 12 | 0.182 | 2.184 | 0.0291 | 43.6 |
| 17 | 12 | 0.182 | 2.184 | 0.0291 | 43.7 |
| 18 | 12 | 0.182 | 2.184 | 0.0291 | 43.7 |
| 20 | 16 | 0.24 | 3.84 | 0.0512 | 53.3 |

TABLE 6-continued

| Time (min) | Volts | Amps | Power (W) | Power (W/cm$^2$) | Temp (° C.) |
|---|---|---|---|---|---|
| 22.5 | 16 | 0.24 | 3.84 | 0.0512 | 55.1 |
| 25 | 16 | 0.24 | 3.84 | 0.0512 | 55.7 |
| 26 | 16 | 0.24 | 3.84 | 0.0512 | 55.7 |
| 27 | 16 | 0.24 | 3.84 | 0.0512 | 55.5 |
| 28 | 16 | 0.24 | 3.84 | 0.0512 | 55.7 |
| 30 | 20 | 0.29 | 5.8 | 0.0773 | 67.3 |
| 32 | 20 | 0.29 | 5.8 | 0.0773 | 71.2 |
| 34 | 20 | 0.29 | 5.8 | 0.0773 | 72 |
| 37.5 | 20 | 0.29 | 5.8 | 0.0773 | 72.3 |
| 38 | 20 | 0.29 | 5.8 | 0.0773 | 72.8 |
| 39 | 20 | 0.29 | 5.8 | 0.0773 | 72.7 |
| 40 | 20 | 0.29 | 5.8 | 0.0773 | 72.7 |
| 41 | 24 | 0 | (Failed) | (Failed) | — |

The results in Table 6 show that the comparison film could be electrically heated. However, when the voltage was increased to 24 volts the film failed. This was believed to be due to cracking of the indium oxide layer. A separate sample of the comparison film was electrically heated using an applied voltage of 16 volts, resulted in a measured current of 0.235 amps. The comparison film became warm to the touch. When the comparison film was bent over the edge of a counter top at a 45° angle, the film failed. Using optical microscopy, a crack could be observed in the coating.

EXAMPLE 21

A 304 mm by 304 mm sample of the film of Example 11 having a sheet resistance of 4.2 ohms/square was electrically joined to busbars so that both metal layers could be energized. The film sample was laminated into the center of a sandwich made from two 0.05 mm thick sheets of PVB placed between two 2 mm glass sheets. The bus to bus resistance was 4.06 ohms. A potential of 16.5 volts was applied to the busbars resulting in a current of 4.06 amps and an applied power density of 299 W/mm$^2$. Within 7 minutes of turning on the voltage, the surface temperature of the glass increased by 20° C. The results are set out below in Table 7, along with the times required to increase the surface temperature by 20° C. at three other applied power densities.

TABLE 7

| Applied Power Density (W/mm$^2$) | Time to increase surface temperature by 29° C. (min) |
|---|---|
| 239 | 9.5 |
| 299 | 7 |
| 580 | 4 |
| 645 | 3.5 |

Using a 42 volt supply, these times would provide useful de-icing performance in windshields of average size, viz., about 0.9 m by about 1.5 m for a typical car windshield and about 0.88 m by about 1.66 m for a typical sport utility vehicle windshield.

EXAMPLE 22

Several films of the invention were subjected to optional plasma post-treatments on one or both sides of the film, and then laminated between glass sheets using the method of Example 21. The laminates were evaluated to determine their compressive shear strength. The film to be tested was cut into a 1" by 1" square. The square of film was laminated into a 1" by 1" standard five-layer window glass laminate structure: Glass-PVB-Film-PVB-Glass. An Instron mechanical tester was fitted with a special appliance. The appliance was prepared from a 2" diameter cylinder of solid machine metal by cutting the cylinder on a plane at a 45 degree angle to the central axis. On the 45 degree flat face of each half of the appliance, a recess was end-milled to a depth approximately half the thickness of the glass used in the laminate. Each recess was milled to accept the 1" by 1" sample snugly. The two halves of the appliance, with the sample fitted into the recesses, were assembled and mounted in the Instron. The Instron was operated in compressive mode, at a crosshead speed of 0.1 inch/min. In this way, the force response of the sample to a 45 degree compressive shear is measured. Typically, the recorded force rises monotonically until sample failure, which is sudden. The maximum force measured prior to sample failure, divided by the unit sample area, was reported as the Compressive Shear Strength. Set out below in Table 8 is the Film Example number, presence or absence of plasma post-treatment atop the uppermost layer of the stack or on the underside of the support, and the measured compressive shear strength.

TABLE 8

| Film Example No. | Substrate | Plasma atop Stack | Plasma under Support | Compressive Shear (Mpa) |
|---|---|---|---|---|
| — | Uncoated PET | No | No | 5.92 |
| 5 | PET | No | No | 1.43 |
| 5 | PET | No | Yes | 1.5 |
| 6 | PET | No | No | 1.57 |
| 6 | PET | No | Yes | 1.76 |
| 10 | PET | No | No | 1.67 |
| 11 | PET | No | No | 1.72 |
| 12 | PET | No | No | 1.48 |
| 15 | PET | Yes | No | 5.3 |
| 16 | PET | Yes | No | 5.01 |
| 16 | PET | Yes | Yes | 7.29 |
| 17 | MOF | No | No | 1.5 |
| 18 | MOF | Yes | No | 6.35 |
| 18 | MOF | Yes | Yes | 15.19 |

EXAMPLE 23

Figure 16:
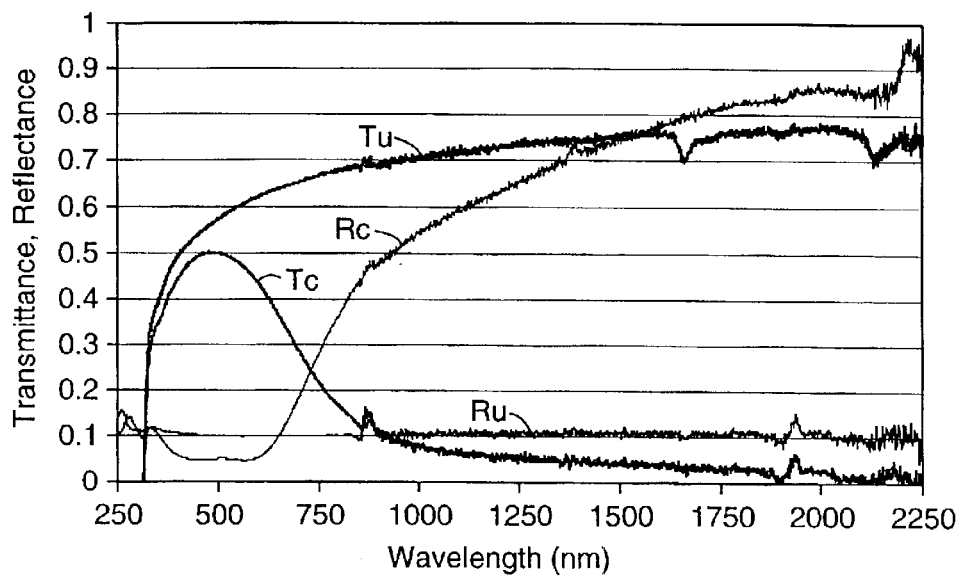

Using the method of Example 2 (but with a 90 sccm argon flow rate for the application of layer 4), a 5 layer infrared-rejecting acrylate/Ag/acrylate/Ag/acrylate optical stack was prepared on a 0.1 mm thick pigmented support film containing 0.06% carbon black particles. In FIG. 16, curves Tu and Ru respectively show the transmission and reflection for the uncoated pigmented support film and curves Tc and Rc respectively show the transmission and reflection for the coated pigmented support film. As shown in FIG. 16, application of the coating made the film highly infrared-reflecting.

Various modifications and alterations of this invention will be apparent to those skilled in the art without departing from this invention. This invention should not be restricted to that which has been set forth herein only for illustrative purposes.

We claim:
1. A process for making a film comprising:
   a) providing a visible light-transmissive support,
   b) forming a visible light-transmissive first metal or metal alloy layer atop the support,
   c) forming an organic spacing layer atop the first metal or metal alloy layer,
   d) crosslinking the spacing layer, and
   e) forming a visible light-transmissive second metal or metal alloy layer atop the organic spacing layer, whereby the thicknesses of the first and second metal or metal alloy layers and the crosslinked spacing layer are such that the film is extensible visible light-transmissive and infrared-reflective.

2. A process according to claim 1 wherein the spacing layer is formed by flash evaporation, vapor deposition and crosslinking of a radiation-crosslinkable monomer.

3. A process according to claim 1 wherein the metal or metal alloy layers comprise silver and the spacing layer comprises an acrylate polymer.

4. A process according to claim 1 further comprising forming a base coat layer between the support and the first metal or metal alloy layer.

5. A process according to claim 1 further comprising modifying an interface between the metal or metal alloy layers and adjacent layers within the film to enhance interlayer adhesion.

6. A process according to claim 5 wherein plasma treatment is employed between each metal or metal alloy layer and adjacent layers within the film.

7. A process according to claim 1 further comprising stretching the film without substantial cracking or creasing of the metal or metal alloy layers.

8. A process according to claim 7 wherein the film, if heated, exhibits different shrinkage in two in-plane directions.

9. A process according to claim 1 further comprising heating and joining together the film and at least one layer of a mechanical energy-absorbing material to provide a safety glazing pre-laminate.

10. A process for making a glazing article comprising:
a) assembling a layer of glazing material and an extensible, visible light-transmissive and infrared-reflective film comprising first and second metal or metal alloy layers separated by a crosslinked polymeric spacing layer, and
b) bonding the glazing material and film together into a unitary article.

11. A process according to claim 10 wherein the glazing material comprises glass and the article further comprises an adhesive layer between the film and the glass.

12. A process for making a laminate article comprising:
a) assembling a first glazing material layer, a first mechanical energy-absorbing layer, a visible light-transmissive and infrared-reflective film layer comprising first and second metal or metal alloy layers separated by a crosslinked polymeric spacing layer, a second mechanical energy-absorbing layer and a second glazing material layer,
b) removing residual air from between the layers, and
c) heating and applying pressure to the layers to bond the layers together into a unitary article.

13. A process according to claim 12 wherein the removal of residual air or the application of pressure to the layers is performed using at least one nip roll.

14. A process according to claim 13 wherein the glazing material layers are non-planar.

15. A process according to claim 14 wherein the layers are bonded together without substantial cracking, creasing or wrinkling of the film.

16. A process according to claim 12 wherein the spacing layer is formed by flash evaporation, vapor deposition and crosslinking of a radiation-crosslinkable monomer.

17. A process according to claim 12 wherein the spacing layer comprises an acrylate polymer.

18. A film comprising first and second metal or metal alloy layers separated by a crosslinked polymeric spacing layer whose thicknesses are such that the film is extensible visible light-transmissive and infrared-reflective.

19. A film according to claim 18 further comprising a flexible plastic support.

20. A film according to claim 19 further comprising a polymeric base coat layer between the support and the first metal or metal alloy layer.

21. A film according to claim 19 wherein an interface between the metal or metal alloy layers and adjacent layers within the film has been subjected to an adhesion-enhancing treatment, or one or more of the adjacent layers comprises an adhesion-enhancing adjuvant, whereby the interlayer adhesion is increased.

22. A film according to claim 21 wherein each of the metal or metal alloy layers and adjacent layers has been subjected to plasma treatment.

23. A film according to claim 19 wherein the film is stretched.

24. A film according to claim 18 further comprising one or more pairs of an additional crosslinked polymeric spacing layer and an additional metal or metal alloy layer atop the second metal layer.

25. A film according to claim 18 wherein the metal or metal alloy layers comprise silver and the spacing layer comprises an acrylate polymer.

26. A film according to claim 18 wherein the film can be laminated into an automotive windshield without substantial wrinkling.

27. A safety glazing pre-laminate comprising at least one layer of a mechanical energy-absorbing material joined to an extensible, visible light-transmissive and infrared-reflective film comprising first and second metal or metal alloy layers separated by a crosslinked polymeric spacing layer.

28. A glazing article comprising at least one layer of glazing material joined to an extensible, visible light-transmissive and infrared-reflective film comprising first and second metal or metal alloy layers separated by a crosslinked polymeric spacing layer.

29. An article according to claim 28 wherein an interface between the metal or metal alloy layers and adjacent layers within the film has been subjected to an adhesion-enhancing treatment, or one or more of the adjacent layers comprises an adhesion-enhancing adjuvant, whereby the interlayer adhesion is increased.

30. An article according to claim 29 wherein one or more of the metal or metal alloy layers or adjacent layers has been subjected to plasma treatment.

31. An article according to claim 29 wherein the metal or metal alloy layers comprise silver and the spacing layer comprises an acrylate polymer.

32. An article according to claim 29 wherein the glazing material comprises non-planar glass and the article is optically clear and infrared-reflective.

33. An article according to claim 29 comprising a windshield.

34. An article according to claim 29 comprising architectural glazing.

35. A vehicle with glazing comprising at least one windshield, backlight, side window or skylight comprising an extensible, visible light-transmissive and infrared-reflective film comprising first and second metal or metal alloy layers separated by a crosslinked polymeric spacing layer.

36. A vehicle according to claim 35 wherein the metal or metal alloy layers comprise silver and the spacing layer comprises an acrylate polymer.

* * * * *

UNITED STATES PATENT AND TRADEMARK OFFICE
CERTIFICATE OF CORRECTION

PATENT NO. : 6,929,864 B2
DATED : August 16, 2005
INVENTOR(S) : Fleming, Robert J.

It is certified that error appears in the above-identified patent and that said Letters Patent is hereby corrected as shown below:

Column 1,
Line 1, insert -- AN -- before "EXTENSIBLE".

Column 2,
Lines 45 and 67, delete "to" and insert -- the --.

Column 4,
Line 51, delete "transmassive" and insert -- transmissive --.

Column 6,
Line 2, delete "("MOW")" and insert -- ("MOF") --.
Line 60, delete "currying" and insert -- carrying --.

Column 24,
Line 2, delete "model" and insert -- Model --.
Line 46, delete "southwall" and insert -- Southwall --.

Column 25,
Line 23, delete "resulted" and insert -- resulting --.
Table 7, Column 2, Heading, Line 2, delete "29° C." and insert -- 20° C. --.

Column 27,
Line 3, after "extensible" insert -- , --.

Column 28,
Line 1, after "extensible" insert -- , --.

Signed and Sealed this

Fourteenth Day of February, 2006

JON W. DUDAS
*Director of the United States Patent and Trademark Office*